(12) United States Patent
Yang

(10) Patent No.: US 11,202,241 B2
(45) Date of Patent: Dec. 14, 2021

(54) BEAM FAILURE RECOVERY METHOD AND TERMINAL

(71) Applicant: VIVO MOBILE COMMUNICATION CO., LTD., Chang'an Dongguan (CN)

(72) Inventor: Yu Yang, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 64 days.

(21) Appl. No.: 16/609,091

(22) PCT Filed: Apr. 27, 2018

(86) PCT No.: PCT/CN2018/084816
§ 371 (c)(1),
(2) Date: Oct. 28, 2019

(87) PCT Pub. No.: WO2018/196851
PCT Pub. Date: Nov. 1, 2018

(65) Prior Publication Data
US 2020/0092785 A1 Mar. 19, 2020

(30) Foreign Application Priority Data

Apr. 28, 2017 (CN) .......................... 201710295923.8

(51) Int. Cl.
*H04W 36/30* (2009.01)
*H04W 76/19* (2018.01)
(Continued)

(52) U.S. Cl.
CPC ......... *H04W 36/305* (2018.08); *H04W 24/04* (2013.01); *H04W 36/06* (2013.01);
(Continued)

(58) Field of Classification Search
CPC ... H04W 36/305; H04W 36/06; H04W 36/26; H04W 76/19; H04W 24/04; H04W 72/046
See application file for complete search history.

(56) References Cited

U.S. PATENT DOCUMENTS

| 10,356,778 | B2 * | 7/2019 | Tseng .................... H04L 5/0053 |
| 2003/0031180 | A1 | 2/2003 | Datta et al. |

(Continued)

FOREIGN PATENT DOCUMENTS

| CN | 105790886 A | 7/2016 |
| CN | 106535213 A | 3/2017 |
| CN | 110268781 A | 9/2019 |

OTHER PUBLICATIONS

1st Chinese Office Action for Chinese Application No. 2017102959238, dated Nov. 26, 2019 (Nov. 26, 2019)—6 pages (English translation—2 pages).

(Continued)

*Primary Examiner* — Robert C Scheibel
(74) *Attorney, Agent, or Firm* — Culhane Meadows PLLC; Stephen J. Weed

(57) ABSTRACT

A beam failure recovery method and a terminal are provided. The method includes: in the case that a quality of a Beam Pair Link (BPL) employed in a current information transmission meets a preset beam failure trigger condition, transmitting to a network-side equipment a beam failure recovery request; in the case that a response signaling transmitted by the network-side equipment is not received within a preset time duration, continuing to transmit to the network-side equipment the beam failure recovery request; and in the case that information related to the beam failure recovery procedure meets a first preset condition, determining that the beam failure recovery is un successful.

13 Claims, 9 Drawing Sheets

(51) Int. Cl.
*H04W 24/04* (2009.01)
*H04W 36/06* (2009.01)
*H04W 36/26* (2009.01)
*H04W 72/04* (2009.01)
*H04W 76/27* (2018.01)

(52) U.S. Cl.
CPC ......... *H04W 36/26* (2013.01); *H04W 72/046* (2013.01); *H04W 76/19* (2018.02); *H04W 76/27* (2018.02)

(56) References Cited

U.S. PATENT DOCUMENTS

| | | | |
|---|---|---|---|
| 2010/0126613 | A1 | 5/2010 | Campbell et al. |
| 2010/0290465 | A1 | 11/2010 | Ankaiah et al. |
| 2016/0150591 | A1 | 5/2016 | Mehrabani et al. |
| 2018/0206170 | A1* | 7/2018 | Nagaraja ............. H04W 36/305 |
| 2018/0227899 | A1* | 8/2018 | Yu ............................. H04B 7/02 |
| 2018/0278310 | A1* | 9/2018 | Lee ...................... H04B 7/0645 |
| 2018/0302889 | A1* | 10/2018 | Guo ........................ H04B 7/088 |
| 2019/0200249 | A1* | 6/2019 | Yoon ..................... H04L 5/0023 |
| 2019/0261344 | A1* | 8/2019 | Grant ..................... H04B 7/022 |
| 2019/0289573 | A1* | 9/2019 | Hwang ............... H04W 72/046 |
| 2019/0335522 | A1* | 10/2019 | Zhang ................... H04W 76/19 |
| 2020/0028545 | A1* | 1/2020 | Koskela ................ H04W 76/19 |
| 2020/0028603 | A1* | 1/2020 | Wang ..................... H04L 5/0051 |
| 2020/0099437 | A1* | 3/2020 | Harada ................. H04W 76/19 |

OTHER PUBLICATIONS

Chinese Search Report for Chinese Application No. 201710295923.8, dated Apr. 15, 2019 (Apr. 15, 2019)—5 pages (English translation—3 pages).
Ericsson: "Beam recovery in NR," 3GPP TSG-RAN WG2 Meeting #97bis, R2-1702678, Spokane, US, Apr. 3, 2017, 4 pages.
Ericsson: "RLM and RLF in NR," 3GPP TSG-RAN WG2 #97bis, R2-1702677, Spokane, US, Apr. 3, 2017, 5 pages.
Extended European Search Report for European Application No. 18789860.6, dated Apr. 9, 2020 (Apr. 9, 2020)—6 pages.
Guangdong OPPO Mobile Telecom: "On Beam Recovery Mechanism," 3GPP TSG RAN WG1 Meeting #88, R1-1701944, Athens, Greece, Feb. 13, 2017, 4 pages.
Huawei, "Link recovery procedure for beam failure," 3GPP TSG RAN WGI Meeting #88b, RI-1704230, Spokane, US, Apr. 3, 2017, 7 pages.
International Search Report and Written Opinion for International Application No. PCT/CN2018/084816, dated Nov. 7, 2019 (Nov. 7, 2019)·8 pages (English translation—5 pages).
Qualcomm Incorporated: "Considerations of RLM and RLF in NR," 3GPP TSG-RAN WG2 Meeting #97bis, R2-1703563, Spokane, US, Apr. 3, 2017, 4 pages.
Samsung, "Discussion on recovery from beam failure," 3GPP TSG RAN WGI Meeting #88bis, RI-1705343, Spokane, US, Apr. 3, 2017, 6 pages.
Yu Jia et al: "Multi-beam satellite resource allocation strategy based on rain attenuation environment", Journal of Beijing University of Aeronautics and Astronautics, vol. 38, No. 3, p. 291-p. 296, Mar. 2012.

* cited by examiner

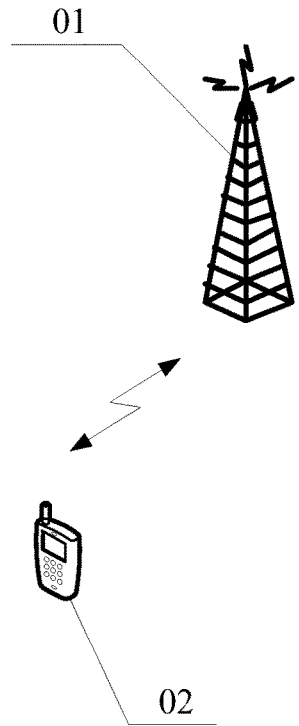

Fig. 1

| | |
|---|---|
| in the case that a quality of a BPL employed in a current information transmission meets a preset beam failure trigger condition, transmitting to a network-side equipment a beam failure recovery request | S101 |
| in the case that a response signaling transmitted by the network-side equipment is not received within a preset time duration, continuing to transmit to the network-side equipment the beam failure recovery request | S102 |
| in the case that information related to the beam failure recovery meets a first preset condition, determining that the beam failure recovery is unsuccessful | S103 |

Fig. 2

BEAM FAILURE RECOVERY METHOD AND TERMINAL

CROSS-REFERENCE TO RELATED APPLICATION

The present application is the U.S. national phase of PCT Application No. PCT/CN2018/084816 filed on Apr. 27, 2018, which claims a priority of the Chinese patent application No. 201710295923.8 filed in China on Apr. 28, 2017, a disclosure of which is incorporated herein by reference in its entirety.

TECHNICAL FIELD

This disclosure relates to the field of communication technology, in particular to a beam failure recovery method and a terminal.

BACKGROUND

Researches of next generation communication system succeeding the fourth generation (4G) mobile communication system have been directed to the task of enlarging a working frequency band supported by the communication system to no less than 6 GHz, up to about 100 GHz. Higher frequency bands have more abundant unoccupied frequency resources and may provide data transmission with greater throughput. Currently, 3GPP has finalized the modeling of high frequency channel. Compared with low frequency band, more antenna array elements may be arranged on a given panel owing to a shorter wavelength of high frequency signal, such that beams with better directivity and narrower lobe may be formed by beamforming.

Since wavelength of a radio signal is shorter in high frequency band communication system, events such as signal propagation being blocked are prone to occur, leading to a disrupted signal transmission. When radio link re-establishment of related art is employed, significantly more time will be cost. As a result, a beam failure recovery mechanism is introduced, i.e., a terminal monitors at physical layer a beam failure detection reference signal transmitted by a base station and evaluates whether quality of the beam failure detection reference signal meets a beam failure trigger condition. Once the condition is met, the terminal may transmit to the base station a beam failure recovery request. Based on the beam failure recovery request, the base station determines a new candidate transmission beam for control information or data transmission. The beam failure recovery procedure enables the communication system to switch rapidly to a backup Beam Pair Link (BPL) and resume control information or data transmission, thereby achieving beam failure recovery. The backup BPL includes the aforementioned new candidate transmission beam and a reception beam.

However, the beam failure recovery procedure of related art fails to acquire a beam failure recovery result accurately, leading to an excessive data transmission latency.

SUMMARY

Embodiments of this disclosure provide a beam failure recovery method and a terminal, to resolve the problem in related art that a beam failure recovery result may not be acquired accurately during a beam failure recovery procedure, leading to an excessive data transmission latency.

In a first aspect, embodiments of this disclosure provide a beam failure recovery method, applied to a terminal and including: in the case that a quality of a BPL employed in a current information transmission meets a preset beam failure trigger condition, transmitting to a network-side equipment a beam failure recovery request; in the case that a response signaling transmitted by the network-side equipment is not received within a preset time duration, continuing to transmit to the network-side equipment the beam failure recovery request; and in the case that information related to the beam failure recovery meets a first preset condition, determining that the beam failure recovery procedure is unsuccessful, where the information related to the beam failure recovery includes at least one of the beam failure recovery request and a beam failure recovery time duration.

In a second aspect, embodiments of this disclosure provide a terminal, including: a transmission module, a reception module and a first determination module, where the transmission module is configured to, in the case that a quality of a BPL employed in a current information transmission meets a preset beam failure trigger condition, transmit to a network-side equipment a beam failure recovery request, and the transmission module is configured to, in the case that a response signaling transmitted by the network-side equipment is not received by the reception module within a preset time duration, continue to transmit to the network-side equipment the beam failure recovery request; and the first determination module is configured to, in the case that information related to the beam failure recovery meets a first preset condition, determine that the beam failure recovery procedure is unsuccessful, where the information related to the beam failure recovery includes at least one of the beam failure recovery request and a beam failure recovery time duration.

In a third aspect, embodiments of this disclosure provide a terminal, including a processor, a storage which stores a program thereon, where the processor is configured to call the program stored on the storage, to implement the method provided in the first aspect of embodiments of this disclosure.

In a fourth aspect, embodiments of this disclosure provide a terminal, including one or more processing elements (or chips) configured to implement the method provided in the above first aspect.

In a fifth aspect, embodiments of this disclosure provide a program configured to be executed by a processor to implement the method provided in the above first aspect.

In a sixth aspect, embodiments of this disclosure provide a program product including the program provided in the fifth aspect, e.g., a computer-readable storage medium.

In a seventh aspect, embodiments of this disclosure provide a computer-readable storage medium storing therein instructions, where the instructions are configured to be executed by a computer, to implement the beam failure recovery method as described in the first aspect.

As such, according to embodiments of this disclosure, in the case that the terminal determines that a quality of a BPL employed in a current information transmission meets a preset beam failure trigger condition, the terminal transmits to a network-side equipment a beam failure recovery request; in the case that a response signaling transmitted by the network-side equipment is not received by the terminal within a preset time duration, the terminal continues to transmit to the network-side equipment the beam failure recovery request; and in the case that at least one of the beam failure recovery request and the beam failure recovery time duration meets a first preset condition, the terminal determines that the beam failure recovery procedure is unsuccessful, such that the terminal may be handed over to a new cell or perform a radio link re-establishment or recovery procedure in a timely manner, and in this way the terminal is absolved from waiting for a response of the network-side equipment for a long time, thereby not only reducing data transmission latency and terminal power consumption but also reducing terminal overhead.

BRIEF DESCRIPTION OF THE DRAWINGS

To better clarify technical solutions of embodiments of this disclosure or related art, drawings used in description of the embodiments or related art are briefly introduced hereinafter. Apparently, the described drawings merely illustrate some of the disclosed embodiments. A person ordinary skilled in the art can obtain other drawings based on the described drawings without any creative efforts.

FIG. 1 is a schematic architectural diagram of a beam failure recovery system provided by this disclosure;

FIG. 2 is a schematic flow diagram of a first embodiment of a beam failure recovery method provided by this disclosure;

DETAILED DESCRIPTION

Figure 3:
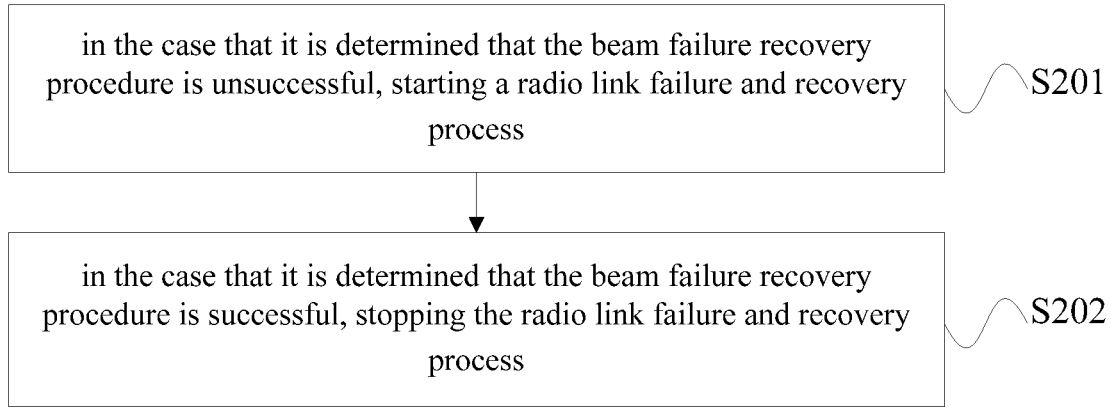
FIG. 3 is a schematic flow diagram of a third embodiment of a beam failure recovery method provided by this disclosure.

To describe the technical problem to be solved, the technical solutions and the advantages of embodiments of this disclosure more clearly, the following describes clearly and completely the technical solutions according to the embodiments of this disclosure with reference to the accompanying drawings in the embodiments of this disclosure. It is apparent the embodiments in the following description are merely a part rather than all of the embodiments of this disclosure. All other embodiments obtained by a person of ordinary skill in the art based on the embodiments of this disclosure without creative efforts shall fall within the scope of this disclosure.

The beam failure recovery method and the terminal provided in the embodiments of this disclosure may be applied to the beam failure recovery system as shown in FIG. 1. As shown in FIG. 1, the system includes: a network-side equipment 01 and a terminal 02.

The network-side equipment 01 may be a Global System of Mobile communication (GSM) or Code Division Multiple Access (CDMA) Base Transceiver Station (BTS), or a Wideband Code Division Multiple Access (WCDMA) NodeB, or a LTE Evolutional Node B (eNB or eNodeB), or a relay station or access point, or a future 5G network base station, etc., which is not limited herein.

The terminal 02 may be wireless or wired. A wireless terminal may refer to a device used to provide users with data connectivity for voice and/or other services, a handheld device with wireless connection function enabled, or other processing device connected to a wireless modem. The wireless terminal may communicate with one or more core networks by a Radio Access Network (RAN). The wireless terminal may be a mobile terminal, such as a mobile telephone (or referred to as a "cellular" phone) or a computer with a mobile terminal, such as a portable, pocket-sized, hand-held, computer built-in, or in-vehicle mobile apparatus, which exchanges voice and/or data with the wireless access network. For example, the wireless terminal may be a device such as a personal communication service (PCS) telephone, a cordless telephone set, a Session Initiation Protocol (SIP) telephone, a Wireless Local Loop (WLL) station, or a Personal Digital Assistant (PDA). The wireless terminal may also be referred to as a system, a Subscriber Unit, a Subscriber Station, a Mobile Station, a Mobile, a Remote Station, a Remote Terminal, an Access Terminal, a User Terminal, a User Agent, or a User Device or User Equipment, which is not limited herein.

Currently, since wavelength of a radio signal is shorter in high frequency band communication system, events such as signal propagation being blocked are prone to occur, leading to a disrupted signal transmission. When radio link re-establishment (or radio link recovery) of related art is employed, significantly more time will be cost. As a result, a beam failure recovery mechanism is introduced, i.e., a terminal monitors a beam failure detection reference signal transmitted by a base station and when a quality of the beam failure detection reference signal meets a beam failure trigger condition, the terminal transmits to the base station a beam failure recovery request. Based on the beam failure recovery request, the base station determines a new candidate transmission beam to resume control information or data transmission, thereby achieving beam failure recovery. However, according to the beam failure recovery procedure of related art, after the terminal transmitted to the base station the beam failure recovery request, the terminal is constantly waiting for the response of the base station, and there is no way for the terminal to know whether the base station has received the beam failure recovery request successfully or whether the base station has transmitted a response message, that is, the terminal may not acquire a beam failure recovery result accurately, thereby constantly putting the terminal in a waiting status, leading to an excessive data transmission latency and a significant terminal power consumption.

To resolve the aforementioned problem in related art, this disclosure provides a beam failure recovery method and a terminal. In specific, embodiments of this disclosure determine an outcome of beam failure recovery procedure according to at least one of a transmitted beam failure recovery request and a beam failure recovery time duration, so that measures such as a radio link recovery procedure may be taken timely, to present the terminal from waiting for a response of the network-side equipment for a long time, thereby not only reducing data transmission latency and terminal power consumption but also reducing terminal overhead.

Before specific embodiments of this disclosure are described, terminologies used in this disclosure will be explained first.

Beam training: currently, in academics and industry, the training of analog beams is usually performed by polling. That is, when a terminal is connected to a cell and there is downlink data to be transmitted, a beam training is performed before the downlink data transmission, i.e., array elements in respective polarization directions of each antenna panel in a base station transmit in a time division multiplexing (TDM) mode a training signal in specified time sequentially (i.e., transmit multiple transmission beams), where each analog beam carries a reference signal, and the reference signal may be a Cell Reference Signal (CRS), a Demodulation Reference Signal (DMRS), a Synchronous Signal (SS), or a Channel State Information Reference Signal (CSI-RS). Optionally, the terminal may receive, on its own reception beam, the reference signal transmitted by the base station on each transmission beam, to measure received power of the reference signals on these transmission beams. Optionally, the terminal may select the transmission beams corresponding to the reference signals with the greatest or relatively greater received power and notify the network-side equipment of identifiers of the selected transmission beams by using a beam report. Optionally, the terminal may notify the network-side equipment of the identifiers of the transmission beams only; optionally, the terminal may additionally notify the network-side equipment of the reception beams corresponding to the selected transmission beams. When there is downlink data to be transmitted, the network-side equipment may choose one transmission beam from the beam report as the transmission beam for current transmission, and the transmission beam and a terminal reception beam corresponding to the transmission beam constitute the BPL employed in the current information transmission.

Beam Pair Link (BPL): the BPL includes a transmission beam and a reception beam. The BPL may be configured to carry a control channel, e.g., a Physical Downlink Control Channel (PDCCH) or a data channel, e.g., a Physical Downlink Shared Channel (PDSCH). It is further to be noted, the term BPL is merely given an exemplary term, and may be referred to as beam link or another terminology by a person skilled in the art.

BPL employed in the current information transmission: the BPL refers to the transmission beam and the reception beam employed during the transmission of control information or data. In a downlink information transmission, the BPL being employed is a downlink BPL which includes a transmission beam employed by the network-side equipment to transmit control information or data and a reception beam employed by the terminal to receive data or control information. In an uplink data transmission, the BPL being employed is an uplink BPL which includes a transmission beam employed by the terminal to transmit data and control information and a reception beam employed by the network-side equipment to receive data and control information. In this disclosure, the BPL employed in the current information transmission is a downlink BPL.

Backup BPL: the backup BPL may be one of the candidate BPLs recommended by the terminal and carried in the beam failure recovery request transmitted by the terminal to the network-side equipment and is determined by the network-side equipment from among the candidate BPLs. Alternatively, the backup BPL may be a BPL with relatively good quality acquired by the network-side equipment by other means. Optionally, the identifier of the backup BPL may be carried in the response signaling transmitted from the network-side equipment to the terminal.

The technical solutions of this disclosure and how the technical solutions solve the aforementioned technical problems are described in detail in the specific embodiments hereinafter. The specific embodiments described hereinafter may be integrated with each other, and same or similar concept or procedure may be omitted in the description of some embodiments. The embodiments of this disclosure are described hereinafter with reference to the accompanying drawings.

FIG. 2 is a schematic flow diagram of a first embodiment of a beam failure recovery method provided by this disclosure. The embodiment involves the specific procedure that after the quality of the BPL employed in the current information transmission meets a preset beam failure trigger condition, the terminal determines the outcome of the beam failure recovery procedure according to information related to the beam failure recovery procedure. The method is performed by the terminal. As shown in FIG. 2, the method includes the following steps.

S101: in the case that a quality of a BPL employed in a current information transmission meets a preset beam failure trigger condition, transmitting to a network-side equipment a beam failure recovery request.

In specific, during a downlink data transmission procedure, the terminal monitors in real time the quality of the BPL employed in the current information transmission, where the BPL is a downlink BPL. Optionally, the terminal may determine the quality of the BPL employed in the current information transmission by detecting the signal-noise ratio (SNR) or received power of a reference signal carried on the BPL employed in the current information transmission. Optionally, the terminal may also determine the quality of the BPL employed in the current information transmission by detecting the SNR or received power of a control channel carried on the BPL employed in the current information transmission.

Optionally, for candidate BPLs acquired from the aforementioned beam training other than the BPL employed in the current information transmission, the terminal may only measure reference signals on these candidate BPLs periodically to acquire the qualities of these BPLs, for use in BPL switching of subsequent beam recovery.

Having acquired the quality of the BPL employed in the current information transmission, the terminal determines whether the quality of the BPL employed in the current information transmission meets a preset beam failure trigger condition. When the condition is met, the terminal starts a beam failure recovery procedure, that is, a timer for the beam failure recovery procedure starts thence. At the same time, the terminal transmits to a network-side equipment a beam failure recovery request. Optionally, the terminal may instead transmit to the network-side equipment the beam failure recovery request when a period of time after the starting of the beam failure recovery procedure lapses. Optionally, the beam failure recovery request may include the candidate BPLs recommended by the terminal, and the candidate BPLs may be candidate BPLs in the beam report acquired from the aforementioned beam training, other than the BPL employed in the current information transmission, or may be BPLs acquired by the terminal by other means that are not in the beam report. Optionally, the beam failure recovery request may also carry parameters related to the restart of beam training or beam tracking, types of causes of beam failure, such as terminal movement, rotation or blocked beam, etc.

Optionally, the terminal may transmit the beam failure recovery request on resources allocated by RRC layer signaling or on dedicated reserved resources. The beam failure recovery request may be transmitted using uplink narrow beam or wide beam acquired from beam training, may be transmitted by means of UL beam sweeping, or may be transmitted using low frequency band radio signals.

Optionally, the preset beam failure trigger condition may include a preset threshold. In the case that the quality, measured by the terminal, of the BPL employed in the current information transmission is lower than the threshold, the terminal determines that the BPL employed in the current information transmission has a poor quality and it is justified to transmit the beam failure recovery request to the network-side equipment so that the data transmission may be switched onto a new backup BPL. In the case that the quality, measured by the terminal, of the BPL employed in the current information transmission is higher than or equal to the threshold, the terminal determines that the BPL employed in the current information transmission has a good quality.

Optionally, the preset beam failure trigger condition may include a preset threshold and further specify a preset quantity of times the quality of the BPL employed in the current information transmission is repeatedly lower than the threshold. In the case that the qualities, measured by the terminal multiple times, of the BPL employed in the current information transmission are lower than the threshold and a quantity of times that the quality of the BPL employed in the current information transmission is lower than the threshold is greater than the preset quantity of times, the terminal determines that the BPL employed in the current information transmission has a poor quality and may transmit the beam failure recovery request to the network-side equipment so that the data transmission may be switched onto a new backup BPL. In the case that the quality, measured by the terminal, of the BPL employed in the current information transmission is higher than or equal to the threshold, the terminal determines that the BPL employed in the current information transmission has a good quality.

Optionally, the preset beam failure trigger condition may include a first beam recovery threshold, a second beam recovery threshold lower than the first beam recovery threshold (when the first beam recovery threshold is equal to the second beam recovery threshold, it actually means that the above beam failure trigger condition includes one preset threshold), and further specify a preset quantity of times that the quality of the BPL employed in the current information transmission is repeatedly lower than the threshold. In the case that the quality, measured by the terminal, of the BPL employed in the current information transmission is lower than the second beam recovery threshold, and after multiple measurements, a quantity of times that the quality of the BPL employed in the current information transmission is lower than the second beam recovery threshold is greater than the preset quantity of times, the terminal determines that the BPL employed in the current information transmission has a poor quality and may transmit the beam failure recovery request to the network-side equipment so that the data transmission may be switched onto a new backup BPL.

It can be seen from the above description, the beam failure trigger condition may be implemented in various ways, thereby enhancing the diversity of the method by which the terminal determines whether the quality of the BPL employed in the current information transmission meets the beam failure trigger condition.

S102: in the case that a response signaling transmitted by the network-side equipment is not received within a preset time duration, continuing to transmit to the network-side equipment the beam failure recovery request, e.g., the beam failure recovery request may be transmitted periodically or in an event-triggered manner.

Specifically, as can be seen from the above description, the time instant when the terminal starts the beam failure recovery procedure is the time instant when the terminal determines that the quality of the BPL employed in the current information transmission meets the preset beam failure trigger condition. In other words, the start time of the beam failure recovery time duration of the terminal is the time instant when the terminal determines that the quality of the BPL employed in the current information transmission meets the preset beam failure trigger condition.

After the terminal transmits the beam failure recovery request to the network-side equipment, the terminal waits to receive the response signaling transmitted by the network-side equipment. Here, there are following three situations: first, the network-side equipment missed the beam failure recovery request transmitted by the terminal, therefore the network-side equipment does not trigger the transmission of the response signaling directed to the beam failure recovery request; second, the network-side equipment has received the beam failure recovery request transmitted by the terminal and has triggered the transmission of the response signaling directed to the beam failure recovery request, but the terminal fails to receive the response signaling; third, the network-side equipment has received the beam failure recovery request transmitted by the terminal and has transmitted the response signaling, and the terminal succeeds in receiving the response signaling directed to the beam failure recovery request.

It is noted, after the network-side equipment receives the beam failure recovery request, the response signaling transmitted by the network-side equipment to the terminal may include an acknowledgement message to the beam failure recovery request, a signaling content regarding a switch to a backup BPL, or a signaling content regarding parameters related to the restart of beam training or beam tracking so as to look for an available backup BPL to resume data transmission thereon. Further, when the network-side equipment is transmitting the response signaling, the network-side equipment may use a different BPL from the BPL employed in the current information transmission that is acquired through beam training, may use a wide beam encompassing the BPL employed in the current information transmission, may use a DL beam sweeping, or may use a low frequency band radio signal. Of course, in the case that the network-side equipment missed the beam failure recovery request transmitted by the terminal, the network-side equipment keeps transmitting control channel and data channel on the BPL employed in the current information transmission.

Optionally, when the terminal receives the response signaling transmitted by the network-side equipment, the terminal may receive the signaling on the BPL employed in the current information transmission, may receive the signaling on a candidate BPL that is different from the BPL employed in the current information transmission and that is acquired through beam training, may receive the signaling on a wide beam encompassing the current BPL, may receive the signaling by DL beam sweeping, or may receive the signaling by a low frequency band radio signal, which is not limited by the embodiments of this disclosure. In the case that the response signaling includes an identifier of a backup BPL, the terminal may resume data transmission to the network-side equipment on the backup BPL according to the instruction of the signaling content; in the case that the response signaling includes parameters related to the restart of beam training, the terminal may cooperate with the network-side equipment to perform a beam search based on the parameters, so as to search for a backup BPL to resume data transmission thereon.

In the case that the terminal fails to receive a response signaling transmitted by the network-side equipment within a preset time duration, the terminal continues to transmit to the network-side equipment the beam failure recovery request, and so on.

In summary of the description of the step S102, when the terminal fails to receive a response signaling transmitted by the network-side equipment within a preset time duration, the terminal continues to transmit to the network-side equipment the beam failure recovery request, which prevents the terminal from waiting for a response signaling to one beam failure recovery request for a long time, thereby improving the probability of receiving the response signaling by the terminal.

S103: in the case that information related to the beam failure recovery meets a first preset condition, determining that the beam failure recovery procedure is unsuccessful.

The information related to the beam failure recovery procedure includes: at least one of the beam failure recovery request and a beam failure recovery time duration. The start time of the beam failure recovery time duration is the time instant when the quality of the BPL employed in the current information transmission meets the beam failure trigger condition.

In specific, in the beam failure recovery procedure, according to the above descriptions of steps S101 and S102, the terminal may transmit to the network-side equipment a beam failure recovery request one or more times, and the beam failure recovery time duration increases with the quantity of times beam failure recovery request is transmitted. The terminal may determine whether the beam failure recovery procedure is successful from the information related to the beam failure recovery procedure. The information related to the beam failure recovery procedure includes at least one of the beam failure recovery request and the beam failure recovery time duration. When the information related to the beam failure recovery procedure meets a first preset condition, the terminal determines that the beam failure recovery procedure is unsuccessful. For example, whether the current beam failure recovery procedure is successful may be determined by determining whether a cutoff time of the beam failure recovery time duration meets the first preset condition, where the first preset condition may be a cutoff time threshold.

In a possible implementation, optionally, the first preset condition may include at least one of: a quantity of times that the beam failure recovery request is transmitted, reaching a first preset quantity of times; a transmission duration during which the beam failure recovery request is transmitted for at least one time, reaching a first preset time duration; and the beam failure recovery time duration reaching a second preset time duration.

In another word, when the terminal determines that the quantity of times that the beam failure recovery request is transmitted has reached the first preset quantity of times, the terminal determines the current beam failure recovery procedure is unsuccessful; or, when the terminal determines that the transmission duration during which the beam failure recovery request is transmitted for at least one time, has reached the first preset time duration, the terminal determines the current beam failure recovery procedure is unsuccessful; or, when the terminal determines that the beam failure recovery time duration has reached the second preset time duration, the terminal determines the current beam failure recovery procedure is unsuccessful; optionally, a combination of any two of the abovementioned three conditions is also possible, e.g., when the terminal determines that the quantity of times that the beam failure recovery request is transmitted has reached the first preset quantity of times and when the terminal determines that the beam failure recovery time duration has reached the second preset time duration, the terminal determines the current beam failure recovery procedure is unsuccessful.

It can be seen from the above descriptions of the steps, in contrast with related art, after the terminal according to the embodiment transmits the beam failure recovery request, the terminal continues to transmit the beam failure recovery request when the terminal hasn't received a response signaling transmitted by the network-side equipment within a preset time duration after the transmission of a beam failure recovery request, thereby preventing the terminal from waiting blindly for the response signaling of the network-side equipment. Meanwhile, the terminal compares or match at least one of the beam failure recovery request and the beam failure recovery time duration with the first preset condition to determine current status of the beam failure recovery procedure. When the at least one of the beam failure recovery request and the beam failure recovery time duration meets the first preset condition, it is determined that the beam failure recovery procedure is unsuccessful, such that the terminal may be handed over to a new cell or perform a radio link re-establishment or recovery procedure in a timely manner. In this way, the terminal is prevented from waiting for a response of the network-side equipment for a long time, thereby not only reducing data transmission latency and terminal power consumption but also reducing terminal overhead.

According to the beam failure recovery method provided by this disclosure, in the case that the terminal determines that a quality of a BPL employed in a current information transmission meets a preset beam failure trigger condition, the terminal transmits to a network-side equipment a beam failure recovery request. In the case that a response signaling transmitted by the network-side equipment is not received by the terminal within a preset time duration, the terminal continues to transmit to the network-side equipment the beam failure recovery request. In the case that at least one of the beam failure recovery request and the beam failure recovery time duration meets the first preset condition, the terminal determines that the beam failure recovery procedure is unsuccessful, such that the terminal may be handed over to a new cell or perform a radio link re-establishment or recovery procedure in a timely manner. In this way, the terminal is prevented from waiting for a response of the network-side equipment for a long time, thereby not only reducing data transmission latency and terminal power consumption but also reducing terminal overhead.

According to the first embodiment, when the quality, measured by the terminal, of the BPL employed in the current information transmission meets the preset beam failure trigger condition, the terminal may start a beam failure recovery procedure. A second embodiment of this disclosure involves the mode of starting the beam failure recovery procedure. Several optional modes are described hereinafter.

Optionally, when the quality, measured by the terminal, of the BPL employed in the current information transmission meets the preset beam failure trigger condition, the terminal may start a Beam Recovery (BR) timer, and duration of the BR timer is equal to the second preset time duration. That is, once the quality, measured by the terminal, of the BPL employed in the current information transmission meets the preset beam failure trigger condition, the BR timer starts and starts timing, and when the BR timer expires (i.e., the beam failure recovery time duration reaches the second preset time duration), the terminal determines that the current beam failure recovery procedure is unsuccessful. In this optional mode, owing to the provision of the BR timer, the terminal may determine whether the beam failure recovery procedure is unsuccessful by determining whether the BR timer expires, thereby the efficiency of determining, by the terminal, whether the beam failure recovery procedure is unsuccessful is greatly improved.

Optionally, the quantity of times that the beam failure recovery request is transmitted in the first preset condition may be counted by a counter for the request provided in the terminal, i.e., upon transmitting to the network-side equipment the beam failure recovery request for the first time, the terminal starts the counter for the request, and a threshold of the counter for the request is the first preset quantity of times. In this way, once the terminal transmits a beam failure recovery request, the counter for the request increments by one, and once the quantity of transmission times of the beam failure recovery request reaches the threshold of the counter for the request, the terminal determines that the current beam failure recovery procedure is unsuccessful. In this optional mode, owing to the provision of the counter for the request, the terminal may determine whether the beam failure recovery procedure is unsuccessful by determining, from the counter for the request, whether the quantity of transmission times of the beam failure recovery request reaches the first preset quantity of times, thereby the efficiency of determining, by the terminal, whether the beam failure recovery procedure is unsuccessful is greatly improved.

Optionally, the transmission durations of multiple transmissions of the beam failure recovery request in the first preset condition may be timed by a timer for the request provided in the terminal, i.e., upon transmitting to the network-side equipment the beam failure recovery request for the first time, the terminal starts the timer for the request, and duration of the timer for the request is equal to the first preset time duration. In this way, once the transmission duration during which the beam failure recovery request is transmitted for at least one time, reaches the timing duration of the timer for the request, the terminal determines that the current beam failure recovery procedure is unsuccessful. In this optional mode, owing to the provision of the timer for the request, the terminal may determine whether the beam failure recovery procedure is unsuccessful by determining whether the timer for the request expires, thereby the efficiency of determining, by the terminal, whether the beam failure recovery procedure is unsuccessful is greatly improved.

In summary, the second embodiment is mainly directed to the specific procedure of determining a result of the beam failure recovery procedure by the terminal, and the beam failure recovery procedure occurs for the most part in the physical layer of the terminal. The following embodiment mainly deals with a determination whether a radio link recovery or radio link re-establishment should be performed in the RRC layer of the terminal according to the result of the beam failure recovery procedure. The rationale thereof is as follows. In related art, when the RRC layer of a terminal determines that a radio link fails, an RRC re-establishment procedure is started in the RRC layer; and when there is data to be transmitted, the terminal would conduct a beam training again to search for an appropriate beam to resume data transmission thereon. Due to a lack of connection between the RRC re-establishment or radio link recovery procedure in the RRC layer and the beam failure recovery procedure in the physical layer of the terminal in related art, i.e., a lack of interlayer interoperability, the following situation may occur: assuming that at certain time point the physical layer of the terminal is performing a beam failure recovery procedure and the RRC layer of the terminal determines that the radio link fails and commences a radio link recovery procedure; after a while, the beam failure recovery procedure in the physical layer of the terminal yields a success, i.e., the terminal has determined that a data transmission may be resumed on a backup BPL, however the RRC layer of the terminal is unaware of this and continues the RRC re-establishment procedure. In this scenario, the RRC re-establishment would stop all links and beams at this time, thereby prolonging the latency in data transmission or disrupting the data transmission.

As a result, the following embodiment is mainly directed to a message intercommunication between the physical layer and the RRC layer of the terminal, so as to associate the beam failure recovery procedure in the physical layer of the terminal with the RRC re-establishment or radio link recovery in the RRC layer of the terminal.

FIG. 3 is a schematic flow diagram of a third embodiment of a beam failure recovery method provided by this disclosure. This embodiment relates to the specific procedure of associating the beam failure recovery procedure in the physical layer of the terminal with the radio link recovery in the RRC layer of the terminal. The method is performed by the terminal. On the basis of the aforementioned embodiments, the method further includes the following steps.

S201: in the case that it is determined that the beam failure recovery procedure is unsuccessful, starting a radio link failure and recovery procedure.

In specific, when the terminal determines that the beam failure recovery procedure in the physical layer of the terminal is unsuccessful as per the aforementioned embodiments, the terminal may determine to start a radio link failure and recovery procedure in the RRC layer of the terminal. Optionally, the physical layer of the terminal may inform the RRC layer of the terminal that the radio link failure and recovery procedure may be started, by transmitting a signaling or instruction to the RRC layer.

As can be seen from the description of this step, in this embodiment, after the beam failure recovery procedure in the physical layer of the terminal is unsuccessful, the physical layer informs, by using corresponding signaling or instruction, the RRC layer of the terminal to start the radio link failure and recovery procedure which includes starting a re-establishment in the RRC layer. Therefore, the following situation may be prevented: despite the fact that a beam failure occurs in the physical layer, the RRC re-establishment won't take place in the RRC layer until a radio link failure is detected in the RRC layer, thereby further reducing the latency in data transmission.

S202: in the case that it is determined that the beam failure recovery procedure is successful, stopping the radio link failure and recovery procedure.

In specific, in this step, the terminal has started the radio link failure and recovery procedure. The radio link failure and recovery procedure may be started prior to the beam failure recovery procedure in the physical layer of the terminal, or may be started during the beam failure recovery procedure.

Thus, as can be seen from the description of this step, when the terminal determines that the beam failure recovery procedure in the physical layer of the terminal is successful as per the aforementioned embodiments, the terminal may, according to a signaling or instruction transmitted from the physical layer to the RRC layer of the terminal, stop the started radio link failure and recovery procedure in the RRC layer, so that the following situation may be prevented: after the beam failure recovery procedure in the physical layer is successful, the radio link re-establishment is performed blindly in the RRC layer of the terminal because there is no way for the RRC layer of the terminal to know beam failure recovery procedure being successful in the physical layer, resulting in the recovered beam being stopped again, thus prolonging the latency in data transmission. This step further reduces the data transmission latency by facilitating the interoperability between the physical layer and the RRC layer of the terminal.

It is noted, there is no particular limitation as to the time sequence of the steps S201 and S202, and the steps S201 and S202 are parallel and depend on the actual status of the beam failure recovery procedure.

According to the beam failure recovery method provided by this disclosure, when the terminal determines that the beam failure recovery procedure in the physical layer is unsuccessful, the terminal starts the radio link failure and recovery procedure in the RRC layer; when the terminal determines that the beam failure recovery procedure in the physical layer is successful, the terminal stops the radio link failure and recovery procedure in the RRC layer. The method may not only prevent the situation that despite the fact that a beam recovery procedure is unsuccessful in the physical layer, the RRC re-establishment won't take place in the RRC layer until a radio link failure is detected in the RRC layer, but also prevent the situation that after the beam failure recovery procedure in the physical layer is successful, the radio link re-establishment is performed blindly in the RRC layer of the terminal because there is no way for the RRC layer of the terminal to know beam failure recovery procedure being successful in the physical layer, resulting in the recovered beam being stopped again, thus prolonging the latency in data transmission. As a result, the method reduces the data transmission latency greatly.

Figure 4:
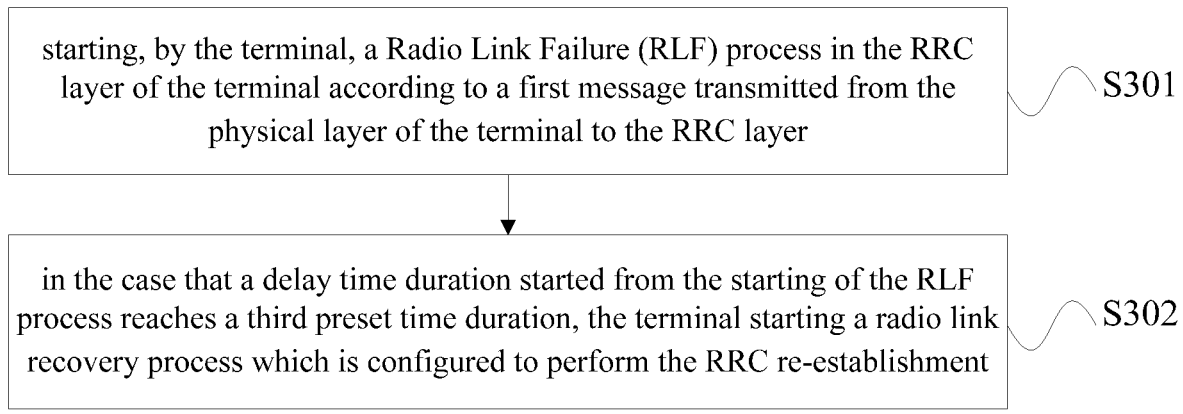
FIG. 4 is a schematic flow diagram of a fourth embodiment of a beam failure recovery method provided by this disclosure.

FIG. 4 is a schematic flow diagram of a fourth embodiment of a beam failure recovery method provided by this disclosure. This embodiment relates to the specific procedure of starting a radio link failure and recovery procedure in the RRC layer of the terminal. On the basis of the embodiment as shown in FIG. 3, the starting of the radio link failure and recovery procedure in the RRC layer of the terminal in the aforementioned step S201 may be achieved by the following steps.

S301: starting, by the terminal, a Radio Link Failure (RLF) procedure in the RRC layer of the terminal according to a first message transmitted from the physical layer of the terminal to the RRC layer.

In specific, the radio link failure and recovery procedure in the RRC layer of the terminal in fact includes two procedures. One procedure is a RLF procedure, in which, essentially, after the RRC layer of the terminal receives the first message from the physical layer, a time duration after the reception of the first message is recorded. When the time duration reaches a third preset time duration, another procedure, i.e., a radio link recovery procedure, is started. The radio link recovery procedure is configured to perform an RRC re-establishment.

In another word, when the terminal determines that the beam failure recovery procedure is successful, the terminal starts the RLF procedure in the RRC layer according to the first message transmitted from the physical layer to the RRC layer of the terminal. The first message may be an out-of-sync message transmitted from the physical layer to the RRC layer of the terminal, or may be an RLF procedure starting message straightforwardly. It can be seen, the physical layer of the terminal may instruct the RRC layer of the terminal to start the RLF procedure in various ways, which improves the diversity of interlayer interoperability.

Figure 5:
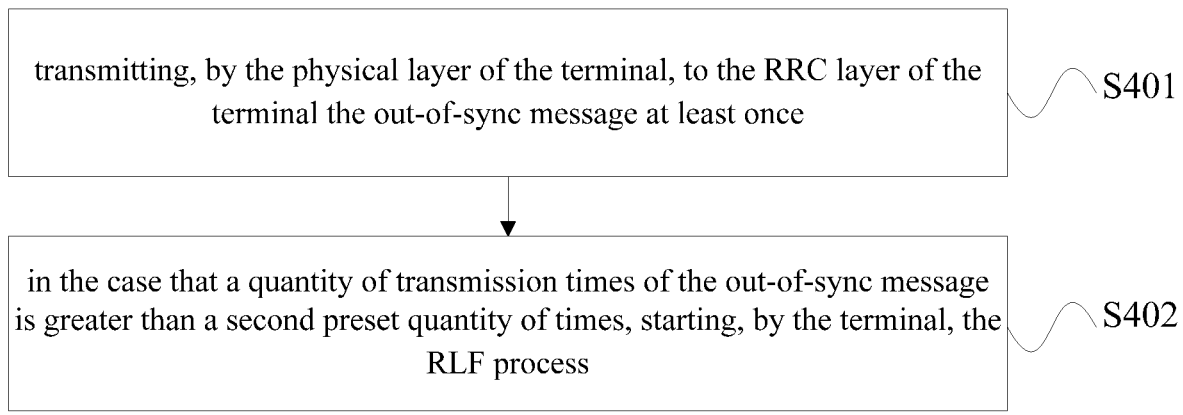
FIG. 5 is a schematic flow diagram of a fifth embodiment of a beam failure recovery method provided by this disclosure.

As to how the terminal starts the RLF procedure in the RRC layer according to the out-of-sync message transmitted from the physical layer to the RRC layer of the terminal, a reference may be made to a fifth embodiment hereinafter, as shown in FIG. 5.

S302: in the case that a delay time duration started from the starting of the RLF procedure reaches a third preset time duration, starting, by the terminal, a radio link recovery procedure which is configured to perform the RRC re-establishment.

In specific, after the RLF procedure is started in the RRC layer of the terminal, the terminal may take no action until the delay time duration started from the starting of the RLF procedure reaches the third preset time duration, and then the terminal starts the radio link recovery procedure to perform the RRC re-establishment. Optionally, after the starting of the RLF procedure and before the delay time duration reaches the third preset time duration, the terminal may measure a quality of omnidirectional beam or wide beam used by synchronization signals or broadcast signals of neighboring cells, etc., to prepare for subsequent data transmission recovery.

In summary of the descriptions of the steps S301 and S302, when the terminal determines that the beam failure recovery procedure is unsuccessful, the terminal starts the RLF procedure in the RRC layer according to the first message transmitted from the physical layer to the RRC layer of the terminal; and when the delay time duration started from the starting of the RLF procedure reaches the third preset time duration, the terminal performs the RRC re-establishment. By informing the RRC layer of the terminal to perform re-establishment with the first message after the beam recovery procedure is unsuccessful in the physical layer, the method prevents the situation that despite the fact that a beam recovery procedure is unsuccessful in the physical layer, the RRC re-establishment won't take place in the RRC layer until a radio link failure is detected in the RRC layer, thereby further reducing the latency in data transmission.

FIG. 5 is a schematic flow diagram of a fifth embodiment of a beam failure recovery method provided by this disclosure. The embodiment relates to the specific procedure of how the terminal starts the RLF procedure in the RRC layer according to the out-of-sync message transmitted from the physical layer to the RRC layer of the terminal when the first message is the out-of-sync message. On the basis of the aforementioned embodiments, the step S301 may include specifically the following steps.

S401: transmitting, by the physical layer of the terminal, to the RRC layer of the terminal the out-of-sync message at least once.

In specific, when a quality, measured by the terminal, of a BPL employed in a current information transmission meets a preset beam failure trigger condition (i.e., the terminal determines that the quality of the BPL employed in the current information transmission is too poor to satisfy the data transmission requirement), the terminal starts the beam failure recovery procedure. During the beam failure recovery procedure or having determined by the terminal that the beam failure recovery procedure is unsuccessful, the physical layer of the terminal transmits to the RRC layer of the terminal the out-of-sync message at least once. The steps of transmitting the out-of-sync message during the beam failure recovery and transmitting, by the physical layer of the terminal to the RRC layer of the terminal the out-of-sync message after the terminal determines that the beam failure recovery procedure is unsuccessful, may be implemented in several modes as follows.

(1) the step of transmitting, by the physical layer of the terminal, to the RRC layer of the terminal the out-of-sync message at least once during the beam failure recovery procedure, may be specifically implemented in the following mode A and mode B.

Mode A: the terminal transmits, by the physical layer of the terminal, to the RRC layer of the terminal the out-of-sync message at least once according to the quantity of times that the beam failure recovery request is transmitted.

In this mode, the terminal may transmit the out-of-sync message to the RRC layer of the terminal in consideration of the quantity of times that the beam failure recovery request is transmitted. Optionally, the physical layer of the terminal may transmit the out-of-sync message to the RRC layer of the terminal once every time one beam failure recovery request is transmitted by the terminal. Optionally, the physical layer of the terminal may transmit the out-of-sync message to the RRC layer of the terminal once every time a preset quantity of beam failure recovery requests are transmitted by the terminal.

Mode B: after the terminal transmits the beam failure recovery request, the terminal transmits, by the physical layer of the terminal, to the RRC layer of the terminal the out-of-sync message at least once according to the quality, measured by the terminal, of the BPL employed in the current information transmission.

In this mode, the terminal starts the beam failure recovery procedure, i.e., the terminal transmits the beam failure recovery request to the network-side equipment. Once the terminal transmits the beam failure recovery request, the physical layer of the terminal continues to measure the quality of the BPL employed in the current information transmission at least once; and every time the quality, measured by the terminal, of the BPL employed in the current information transmission is lower than a second threshold, the terminal transmits one out-of-sync message to the RRC layer of the terminal. Optionally, the second threshold may be the second beam recovery threshold among thresholds of the preset beam failure trigger condition or a second RLF threshold among thresholds of a preset RLF trigger condition. The thresholds of the preset beam failure trigger condition includes the first beam recovery threshold and a second beam recovery threshold and the first beam recovery threshold is greater than the second beam recovery threshold. The thresholds of the preset RLF trigger condition includes the first RLF threshold and the second RLF threshold and the first RLF threshold is greater than the second RLF threshold.

(2) the step of transmitting, by the physical layer of the terminal, to the RRC layer of the terminal the out-of-sync message at least once after the beam failure recovery procedure is unsuccessful, is specifically implemented as follows: after the terminal determines that the beam failure recovery procedure is unsuccessful, the physical layer of the terminal transmits to the RRC layer of the terminal the out-of-sync message at least once according to a preset out-of-sync transmission scheme.

In this mode, after the terminal determines that the beam failure recovery procedure is unsuccessful as per the first embodiment, the physical layer of the terminal transmits to the RRC layer of the terminal the out-of-sync message at least once according to the preset out-of-sync transmission scheme.

Optionally, the preset out-of-sync transmission scheme may include: after the beam failure recovery procedure is unsuccessful, the terminal measures the quality of the BPL employed in the current information transmission again (e.g., the terminal measures a received power or SNR of a reference signal, a synchronization signal, or a broadcast channel on the BPL employed in the current information transmission), and the physical layer of the terminal transmits to the RRC layer of the terminal the out-of-sync message every time the measured quality of the BPL doesn't meet the second threshold.

Optionally, the preset out-of-sync transmission scheme may include: after the beam failure recovery procedure is unsuccessful, the terminal measures the quality of another BPL in the beam report acquired from the beam training, and the physical layer of the terminal transmits to the RRC layer of the terminal the out-of-sync message every time the measured quality of the another BPL doesn't meet the second threshold.

Optionally, the preset out-of-sync transmission scheme may include: after the beam failure recovery procedure is unsuccessful, the terminal measures a quality of a wide beam containing the BPL employed in the current information transmission, and the physical layer of the terminal transmits to the RRC layer of the terminal the out-of-sync message every time the measured quality of the wide beam doesn't meet the second threshold.

As can be seen from the description of the step S401, the physical layer of the terminal may be triggered in various ways to transmit to the RRC layer of the terminal the out-of-sync message at least once, thereby the diversity of the way of transmitting the out-of-sync message from the physical layer to the RRC layer of the terminal is enhanced, facilitating the terminal to start the RLF procedure subsequently according to a quantity of times that the out-of-sync message is transmitted.

S402: in the case that a quantity of transmission times of the out-of-sync message is greater than a second preset quantity of times, starting, by the terminal, the RLF procedure.

In specific, when a quantity of times that the out-of-sync message is received by the RRC layer of the terminal is greater than the second preset quantity of times, the terminal starts the RLF procedure, i.e., the terminal starts the RLF timer whose duration is equal to the third preset time duration. In another word, when the RLF timer is started, the RLF timer starts timing and when the RLF timer expires, the terminal starts a radio link recovery procedure to perform the RRC re-establishment. As can be seen from the description of this step, the terminal may determine whether to start the RLF procedure according to a comparison between the quantity of times that the out-of-sync message is transmitted and the second preset quantity of times. Thus the mode of determining whether to start the RLF procedure is simple and the message intercommunication between the physical layer and the RRC layer of the terminal is achieved by means of the out-of-sync message.

According to the beam failure recovery method provided by this disclosure, the physical layer of the terminal transmits to the RRC layer of the terminal the out-of-sync message at least once; when the quantity of transmission times of the out-of-sync message is greater than the second preset quantity of times, the RRC layer of the terminal is triggered to start the RLF procedure, i.e., the RLF timer is started; and when the RLF timer expires, a radio link recovery procedure is started in the RRC layer of the terminal. The method achieves the interoperability between the beam failure recovery procedure in the physical layer and the radio link recovery in the RRC layer of the terminal by means of the out-of-sync message, preventing the situation that despite the fact that a beam recovery procedure is unsuccessful in the physical layer, the RRC re-establishment won't take place in the RRC layer until a radio link failure is detected in the RRC layer, thus reducing the latency in data transmission further.

In summary, FIG. 4 and FIG. 5 illustrate the procedure of instructing, by the physical layer of the terminal, the RRC layer of the terminal to start the radio link failure and recovery procedure by means of the first message after the terminal determines that the beam failure recovery procedure in the physical layer of the terminal is unsuccessful. The following embodiments are mainly directed to a procedure of instructing, by the physical layer of the terminal, the RRC layer of the terminal to stop the started radio link failure and recovery procedure by means of a second message after the terminal determines that the beam failure recovery procedure in the physical layer of the terminal is successful. Prior to a description of the procedure, a procedure as to how the terminal determines that the beam failure recovery procedure is successful is explained, referring to a sixth embodiment as shown in FIG. 6.

Figure 6:
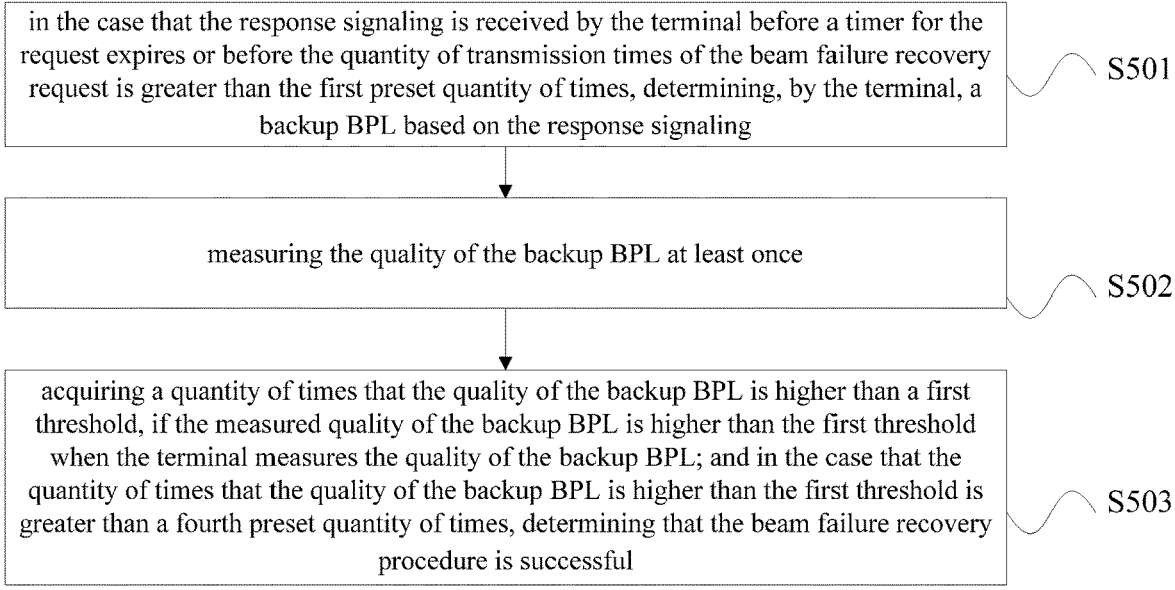
FIG. 6 is a schematic flow diagram of a sixth embodiment of a beam failure recovery method provided by this disclosure.

FIG. 6 is a schematic flow diagram of the sixth embodiment of the beam failure recovery method provided by this disclosure. The sixth embodiment relates to the procedure as to how the terminal determines that the beam failure recovery procedure is successful. In this embodiment, the thresholds of the beam failure trigger condition may include the first beam recovery threshold $Q_{in,BR}$ and a second beam recovery threshold $Q_{out,BR}$, and the first beam recovery threshold is greater than the second beam recovery threshold. On the basis of the embodiment as shown in FIG. 2, subsequent to the step S101, the method further includes the following steps.

S501: in the case that the response signaling is received by the terminal before a timer for the request expires or before the quantity of times that the beam failure recovery request is transmitted by the terminal is greater than the first preset quantity of times, determining, by the terminal, a backup BPL based on the response signaling.

In specific, during downlink data transmission, the terminal measures the quality of the BPL employed in the current information transmission periodically or triggered. When the terminal determines that the quantity of times that the quality of the BPL employed in the current information transmission is lower than the second beam recovery threshold $Q_{out,BR}$ reaches a preset quantity of times (the preset quantity of times may be configured by the RRC layer of the terminal), the terminal determines that the quality of the BPL employed in the current information transmission meets a preset beam failure recovery trigger condition. Then the terminal starts the beam failure recovery procedure, i.e., starts the BR timer. After the beam failure recovery procedure is started, the terminal transmits to the network-side equipment the beam failure recovery request. When the terminal transmits to the network-side equipment the beam failure recovery request for the first time, at least one of the counter for the request and the timer for the request is started.

After the terminal transmits a beam failure recovery request, when the terminal hasn't received the response signaling transmitted by the network-side equipment within a preset time duration after the transmission of the beam failure recovery request, the terminal continues to transmit to the network-side equipment the beam failure recovery request, and meanwhile the counter for the request increments by one and the timer for the request continues timing. When the response signaling is received by the terminal before the timer for the request expires or before the quantity of times that the beam failure recovery request is transmitted by the terminal is greater than the first preset quantity of times, the terminal determines the backup BPL selected by the network-side equipment based on the content of the response signaling and resumes data transmission on the backup BPL.

As can be seen from the description of this step, the terminal transmits to the network-side equipment the beam failure recovery request at least once, which improves the probability of receiving, by the terminal, the response signaling before the timer for the request expires or before the quantity of times that the beam failure recovery request is transmitted by the terminal is greater than the first preset quantity of times, thereby improving further the efficiency of determining the backup BPL by the terminal.

S502: measuring the quality of the backup BPL at least once.

S503: acquiring a quantity of times that the quality of the backup BPL is higher than a first threshold every time, if the measured quality of the backup BPL is higher than the first threshold when the terminal measures the quality of the backup BPL; and in the case that the quantity of times that the quality of the backup BPL is higher than the first threshold is greater than a fourth preset quantity of times, determining that the beam failure recovery procedure is successful.

The first threshold may be the first beam recovery threshold among thresholds of the preset beam failure trigger condition or the first RLF threshold among thresholds of the preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Optionally, the thresholds of the preset RLF trigger condition may include one RLF threshold only, which is equivalent to the situation in which the first RLF threshold is the same as the second RLF threshold, thus a repeated description thereof is omitted herein.

In specific, after the terminal determines the backup BPL and resumes the data transmission on the backup BPL, the terminal continues measuring the quality of the backup BPL (e.g., by measuring the received power or SNR of a reference signal or control channel on the backup BPL). When the quality of the backup BPL is higher than the first threshold, the terminal increments the quantity of times that the quality of the backup BPL is higher than the first threshold by one. When the quantity of times that the quality of the backup BPL is higher than the first threshold acquired by the terminal is greater than the fourth preset quantity of times, the terminal determines that the beam failure recovery procedure is successful.

Optionally, after the terminal determines the backup BPL based on the response signaling, when the terminal acquires control channel information on the backup BPL, the terminal may also determine that the beam failure recovery procedure is successful. Optionally, the acquisition of the control channel information may include: the terminal receives the control channel information on the backup BPL successfully and decodes or demodulates the content of the control channel information successfully.

In addition, when the terminal determines that the beam failure recovery procedure is successful, the terminal may stop the BR timer, i.e., reset the BR timer.

Figure 7:
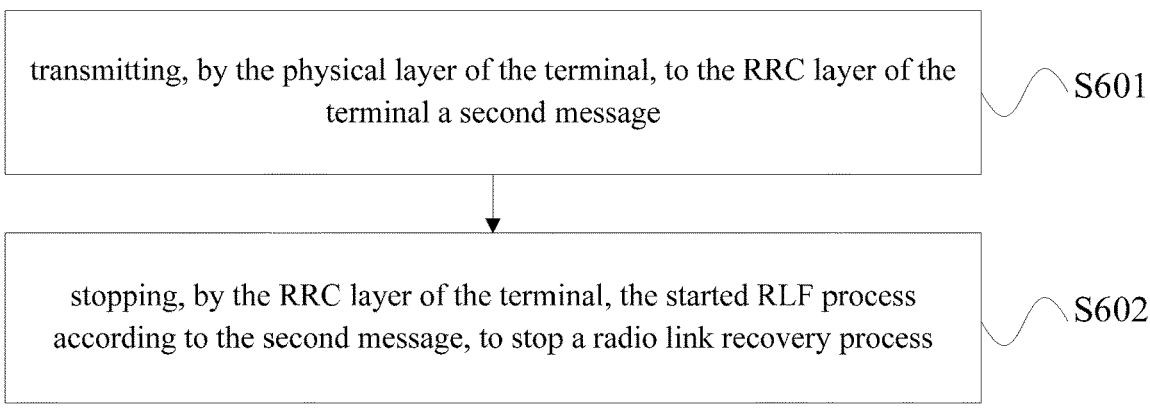
FIG. 7 is a schematic flow diagram of a seventh embodiment of a beam failure recovery method provided by this disclosure.

Further, when the terminal determines that the beam failure recovery procedure is successful, the physical layer of the terminal may instruct the RRC layer of the terminal to stop the started radio link failure and recovery procedure. FIG. 7 is a schematic flow diagram of a seventh embodiment of a beam failure recovery method provided by this disclosure. The seventh embodiment relates to the specific procedure of stopping, by the RRC layer of the terminal, the radio link failure and recovery procedure after the terminal determines that the beam failure recovery procedure is successful. On the basis of the embodiments as shown in FIG. 3 and FIG. 6, the step S202 of stopping, by the RRC layer of the terminal, the radio link failure and recovery procedure includes specifically the following steps.

S601: transmitting, by the physical layer of the terminal, to the RRC layer of the terminal a second message.

S602: stopping, by the RRC layer of the terminal, the started RLF procedure according to the second message, to stop the radio link recovery procedure.

In specific, as can be seen from the above description, starting, by the terminal, the RLF procedure, is essentially that the RLF timer is started, the RLF timer starts timing when the RLF timer is started, and when the RLF timer expires, the RRC layer of the terminal starts the radio link recovery procedure. An upper layer of the terminal configures the RLF timer, such that the terminal determines whether to perform a radio link recovery based on whether the RLF timer expires, thereby simplifying the determination, by the RRC layer of the terminal, as to whether to perform the radio link recovery and improving the efficiency of determining, by the RRC layer of the terminal, whether to perform the radio link recovery.

The time instant when the RLF timer is started in this embodiment is different from the time instant when the RLF timer is started in the embodiments as shown in FIG. 4 and FIG. 5. In FIG. 4 and FIG. 5, the time instant when the RLF timer is started is the time instant when the quantity of times the out-of-sync message is received by the RRC layer of the terminal is greater than the second preset quantity of times after the terminal starts the beam failure recovery procedure; while in this embodiment, the starting of the RLF procedure is independent of the starting of the beam failure recovery. A detailed description is as follows.

The terminal samples periodically or in real time the quality of the BPL employed in the current information transmission. When the quality of the BPL employed in the current information transmission meets a preset RLF trigger condition (i.e., the quality of the BPL employed in the current information transmission is lower than the second RLF threshold $Q_{out,RLF}$ among the thresholds of the preset RLF trigger condition), the physical layer of the terminal transmits to the RRC layer of the terminal the out-of-sync message at least once. When the quantity of transmission times of the out-of-sync message is greater than the second preset quantity of times, the RRC layer of the terminal starts the RLF procedure, i.e., starts the RLF timer. Meanwhile, as described as to the first embodiment, the terminal also determines whether the quality of the BPL employed in the current information transmission meets the preset beam failure recovery trigger condition. When the quality of the BPL employed in the current information transmission meets the preset beam failure recovery trigger condition (i.e., the quality of the BPL employed in the current information transmission is lower than the second beam recovery threshold $Q_{out,BR}$ among the thresholds of the preset beam failure recovery trigger condition), the physical layer of the terminal also starts the beam failure recovery procedure, i.e., starts the BR timer. In another word, the starting of the BR timer is independent of the starting of the RLF timer, i.e., the two timers may be started at the same time or at different time instants, as long as the time instant when the RLF timer is started precedes the time instant when the BR timer is started or falls within the time duration of the beam failure recovery procedure. The time instant when the RLF timer is started and the time instant when the BR timer is started depend on the preset beam failure recovery trigger condition and the preset RFL trigger condition. In this embodiment, the beam failure recovery trigger condition includes the first beam recovery threshold $Q_{in,BR}$ and the second beam recovery threshold $Q_{out,BR}$ which is lower than the first beam recovery threshold. The preset RLF trigger condition includes the first RLF threshold $Q_{in,RLF}$ and the second RLF threshold $Q_{out,RLF}$ which is lower than the first RLF threshold $Q_{in,RLF}$. Optionally, the thresholds of the two conditions may be equal to each other or different from each other, for example, $Q_{in,BR}=Q_{in,RLF}$, $Q_{out,BR}=Q_{out,RLF}$, or $Q_{in,BR}<Q_{in,RLF}$, $Q_{out,BR}>Q_{out,RLF}$.

In summary, in this embodiment, the time instant when the RLF timer is started precedes the time instant when the BR timer is started or falls within the time duration of the beam failure recovery procedure. That is, when the physical layer of the terminal starts the beam failure recovery procedure, the RLF timer in the RRC layer of the terminal has begun timing to allow for the radio link recovery in case the RLF timer expires, which in effect simulates a scenario in which the physical layer and the RRC layer of the terminal act independently of each other without interoperability. Therefore, in this embodiment, when the terminal determines that the beam failure recovery procedure is successful, the physical layer of the terminal transmits a second message to the RRC layer of the terminal in a timely manner, to inform the RRC layer to stop the started RLF procedure, i.e., stop the running RLF timer, so as to prevent the RRC layer from performing the radio link recovery and as a result disrupting the newly recovered beam.

Optionally, the second message may be at least one in-sync message, or one RLF procedure stopping message. As can be seen from the above description, in the aforementioned step S601, the physical layer of the terminal may instruct the RRC layer of the terminal to stop the radio link recovery procedure in various ways, which not only prevents the RRC layer of the terminal from performing a radio link recovery and as a result disrupting the recovered beam, but also enhances the diversity of interlayer interoperability.

Figure 8:
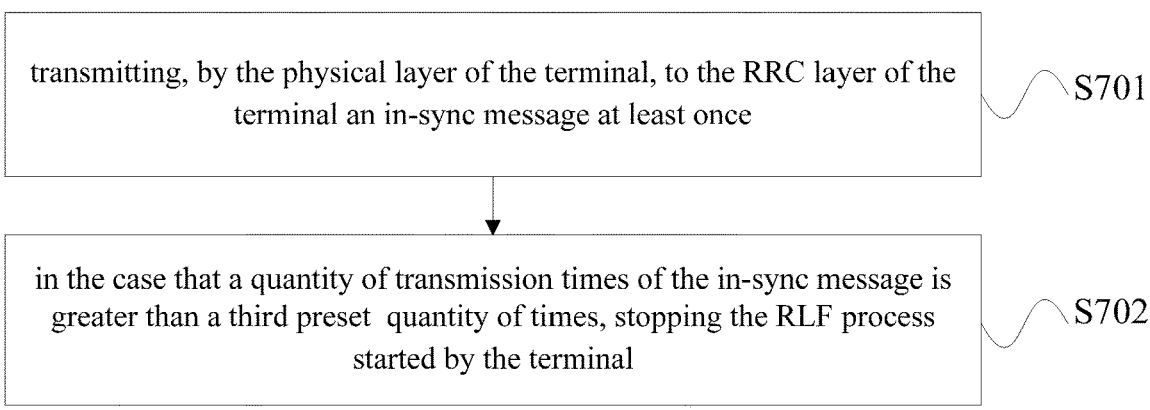
FIG. 8 is a schematic flow diagram of an eighth embodiment of a beam failure recovery method provided by this disclosure.

Regarding the specific procedure of stopping the started RLF procedure by the terminal when the second message is at least one in-sync message, a reference may be made to an eighth embodiment as shown in FIG. 8. As shown in FIG. 8, the method includes the following steps.

S701: transmitting, by the physical layer of the terminal, to the RRC layer of the terminal an in-sync message at least once.

In specific, when the terminal receives a response signaling before the timer for the request expires or before the quantity of times the beam failure recovery request is transmitted by the terminal exceeds the first preset quantity of times, the terminal may determine the backup BPL selected by the network-side equipment based on the content of the response signaling and measure the quality of the backup BPL at least once. Every time the backup BPL is measured and the quality of the backup BPL is higher than the first threshold, the physical layer of the terminal transmits to the RRC layer of the terminal the in-sync message once. The first threshold may be a first beam recovery threshold $Q_{in,BR}$ among thresholds of the preset beam failure trigger condition or a first RLF threshold $Q_{in,RLF}$ among thresholds of the preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Based on this, the physical layer of the terminal may transmit to the RRC layer of the terminal the in-sync message one or more times.

S702: in the case that a quantity of transmission times of the in-sync message is greater than a third preset quantity of times, stopping the RLF procedure started by the terminal.

In specific, when a quantity of times that the in-sync message transmitted by the physical layer of the terminal is received by the RRC layer of the terminal is greater than the third preset quantity of times, the RRC layer of the terminal stops the currently started RLF procedure, i.e., stops the started RLF timer, so that the RRC layer of the terminal doesn't perform the radio link recovery procedure.

According to the beam failure recovery method provided by this embodiment, after the beam failure recovery procedure is successful, the physical layer of the terminal instructs, by transmitting the second message to the RRC layer of the terminal, the RRC layer of the terminal to stop the started RLF procedure, i.e., stop the started RLF timer, such that the RRC layer of the terminal doesn't perform the RRC re-establishment, thereby preventing the situation that a radio link recovery performed autonomously by the RRC layer results in the disruption of a recovered beam, despite the fact that a beam recovery procedure is successful in the physical layer of the terminal. The embodiment of this disclosure reduces the latency in data transmission by enabling the message intercommunication between the physical layer and the RRC layer of the terminal.

To facilitate an understanding of technical solutions of the embodiments of this disclosure, the procedures of the embodiments of this disclosure are described with reference to two complete embodiments hereafter.

Figure 9A:
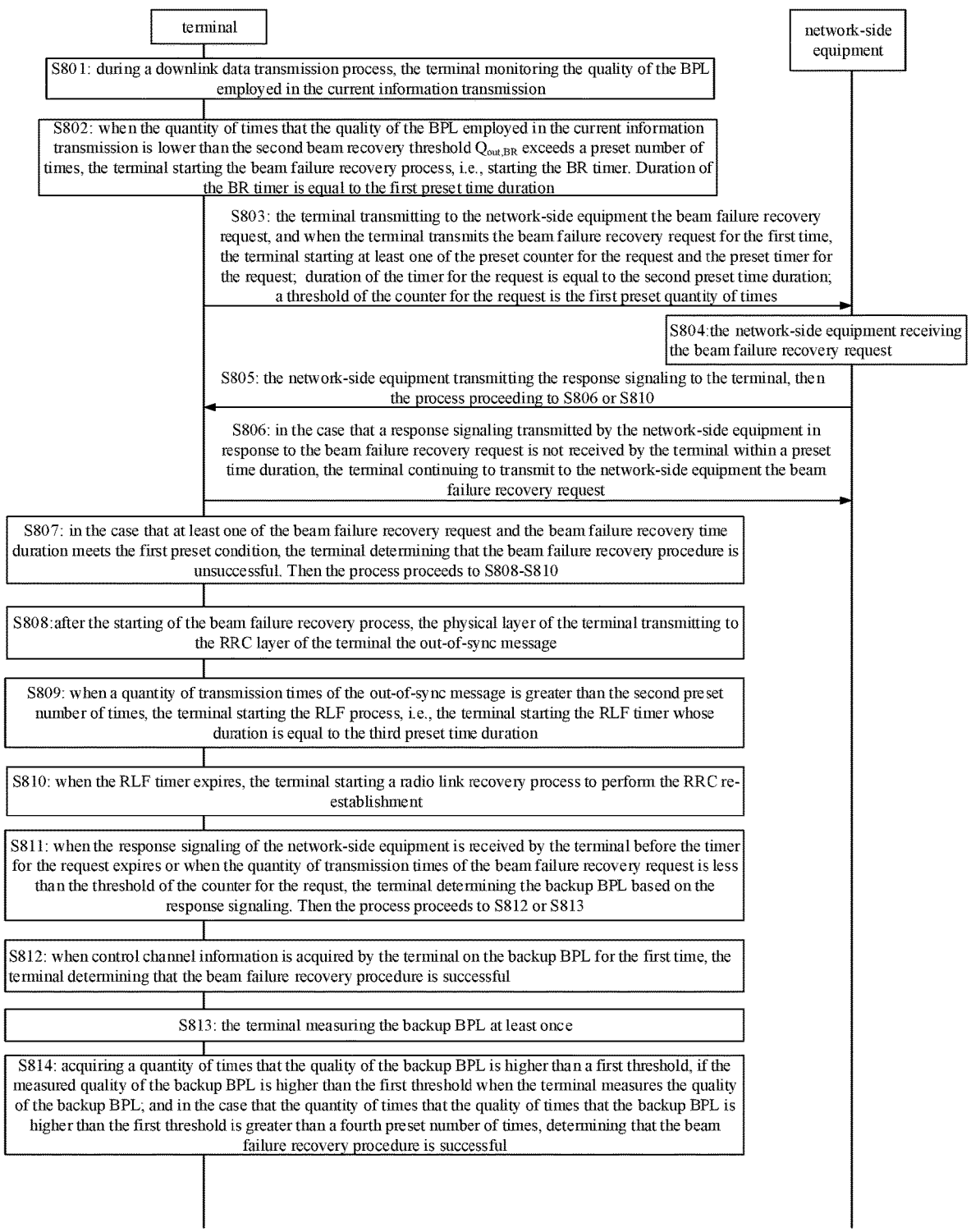
FIG. 9a is a schematic flow diagram of a ninth embodiment of a beam failure recovery method provided by this disclosure.

FIG. 9a is a schematic flow diagram of a ninth embodiment of a beam failure recovery method provided by this disclosure. This embodiment relates to a procedure in which the beam failure recovery procedure in the physical layer of the terminal and the RLF procedure in the RRC layer of the terminal are performed in series. That is, the starting of the RLF procedure is subsequent to the beam failure recovery procedure in the physical layer of the terminal. In this embodiment, the preset beam failure recovery trigger condition includes the first beam recovery threshold $Q_{in,BR}$ and the second beam recovery threshold $Q_{out,BR}$ which is lower than the first beam recovery threshold. The preset RLF trigger condition includes $Q_{in,RLF}$ and $Q_{out,RLF}$ which is lower than $Q_{in,RLF}$. The method includes the following steps.

S801: during a downlink data transmission procedure, the terminal monitoring the quality of the BPL employed in the current information transmission.

S802: when the quantity of times that the quality of the BPL employed in the current information transmission is lower than the second beam recovery threshold $Q_{out,BR}$ exceeds a preset quantity of times, the terminal starting the beam failure recovery procedure, i.e., starts the BR timer. Duration of the BR timer is equal to the first preset time duration.

S803: the terminal transmitting to the network-side equipment the beam failure recovery request, and when the terminal transmits the beam failure recovery request for the first time, the terminal starting at least one of the preset counter for the request and the preset timer for the request. Duration of the timer for the request is equal to the second preset time duration. A threshold of the counter for the request is the first preset quantity of times.

S804: the network-side equipment receiving the beam failure recovery request.

Here, there may be two scenarios: first, the network-side equipment fails to receive the beam failure recovery request; second, the network-side equipment receives the beam failure recovery request successfully. For an explanation of the specific procedure, refer to the description of the first embodiment.

S805: the network-side equipment transmitting the response signaling to the terminal, then the procedure proceeding to S806 or S810.

In connection with the aforementioned two scenarios in step S804, there are two corresponding scenarios in this step: first, the network-side equipment receives the beam failure recovery request successfully and transmits the response signaling to the terminal; second, the network-side equipment fails to receive the beam failure recovery request and doesn't transmit the response signaling to the terminal.

Optionally, after the terminal transmits to the network-side equipment the beam failure recovery request, the terminal may receive, on the BPL employed in the current information transmission and at least one backup BPL, the response signaling transmitted by the network-side equipment. For example, the network-side equipment and the terminal may find two or more BPLs with reasonable quality by using beam training. Optionally, a BPL with best quality of these BPLs may be determined as the BPL employed in the current information transmission (called serving BPL), the rest of these BPLs may be determined as candidate BPLs and the backup BPL may be one of the candidate BPLs. The serving BPL is adapted for the control channel and data channel transmission between the network-side equipment and the terminal. The candidate BPL is adapted for resuming a transmission thereon in case the serving BPL is blocked or the transmission is disrupted for some other reasons. During normal operation of the serving BPL, reference signals may be transmitted on the candidate BPL to facilitate the terminal to measure the quality of the candidate BPL periodically.

When the terminal determines that the beam failure recovery procedure is unsuccessful, the terminal receives only the control channel information and reference signal on the serving BPL, and only measures downlink reference signal on the backup BPL to identify the quality of the candidate BPL.

When the terminal determines that the beam failure recovery procedure is unsuccessful, the terminal transmits the beam failure recovery request to the base station. Whether in the condition that the terminal fails to transmit the beam failure recovery request or in the condition that the network-side equipment fails to transmit the response signaling, an abnormal in beam recovery occurs, and as such it's impossible for the terminal to receive the response signaling from the base station after transmitting the beam failure recovery request. As a result, optionally, the terminal may receive the response signaling transmitted by the network-side equipment on every BPL acquired from the beam training. Optionally, the response signaling may include acknowledgement information to the beam failure recovery request, or information related to the backup BPL, or alternatively, the response signaling may include control channel information (e.g., PDCCH information) and information related to the backup BPL. The optional reception mode improves the success rate of receiving the response signaling and the probability of success of the beam failure recovery procedure, as well as speeds up the beam failure recovery.

S806: in the case that a response signaling transmitted by the network-side equipment in response to the beam failure recovery request is not received by the terminal within a preset time duration, the terminal continuing to transmit to the network-side equipment the beam failure recovery request.

S807: in the case that at least one of the beam failure recovery request and the beam failure recovery time duration meets the first preset condition, the terminal determining that the beam failure recovery procedure is unsuccessful. Then the procedure proceeds to S808-S810.

In specific, the determining that the beam failure recovery procedure is unsuccessful may be at least one of the following conditions: when the transmission duration during which the beam failure recovery request is transmitted by the terminal for at least one time, exceeds the first preset time duration, i.e., the timer for the request expires, the terminal determines that the beam failure recovery procedure is unsuccessful; when the quantity of times the beam failure recovery request is transmitted by the terminal exceeds the threshold of the counter for the request, i.e., the first preset quantity of times, the terminal determines that the beam failure recovery procedure is unsuccessful; when the BR timer of the terminal expires, the terminal determines that the beam failure recovery procedure is unsuccessful.

S808: after the starting of the beam failure recovery procedure, the physical layer of the terminal transmitting to the RRC layer of the terminal the out-of-sync message.

Optionally, the physical layer of the terminal may transmit to the RRC layer the out-of-sync message at least once during the beam failure recovery procedure. Optionally, the physical layer of the terminal may transmit to the RRC layer the out-of-sync message at least once according to a preset out-of-sync transmission scheme after the terminal determines that the beam failure recovery procedure is unsuccessful.

S809: when a quantity of transmission times of the out-of-sync message is greater than the second preset quantity of times, the terminal starting the RLF procedure, i.e., the terminal starting the RLF timer whose duration is equal to the third preset time duration.

S810: when the RLF timer expires, the terminal starting a radio link recovery procedure to perform the RRC re-establishment.

S811: when the response signaling of the network-side equipment is received by the terminal before the timer for the request expires or when the quantity of transmission times of the beam failure recovery request is less than the threshold of the counter for the request, the terminal determining the backup BPL based on the response signaling. Then the procedure proceeds to S812 or S813.

S812: when control channel information is acquired by the terminal on the backup BPL for the first time, the terminal determining that the beam failure recovery procedure is successful.

S813: the terminal measuring the backup BPL at least once.

S814: acquiring a quantity of times that the quality of the backup BPL is higher than a first threshold, if the measured quality of the backup BPL is higher than the first threshold when the terminal measures the quality of the backup BPL; and in the case that the quantity of times that the quality of the backup BPL is higher than the first threshold is greater than a fourth preset quantity of times, determining that the beam failure recovery procedure is successful.

For an explanation of the specific implementation procedure of the steps S801 to S814, refer to the description of the above embodiments, thus a repeated description thereof is omitted herein.

Figure 9B:
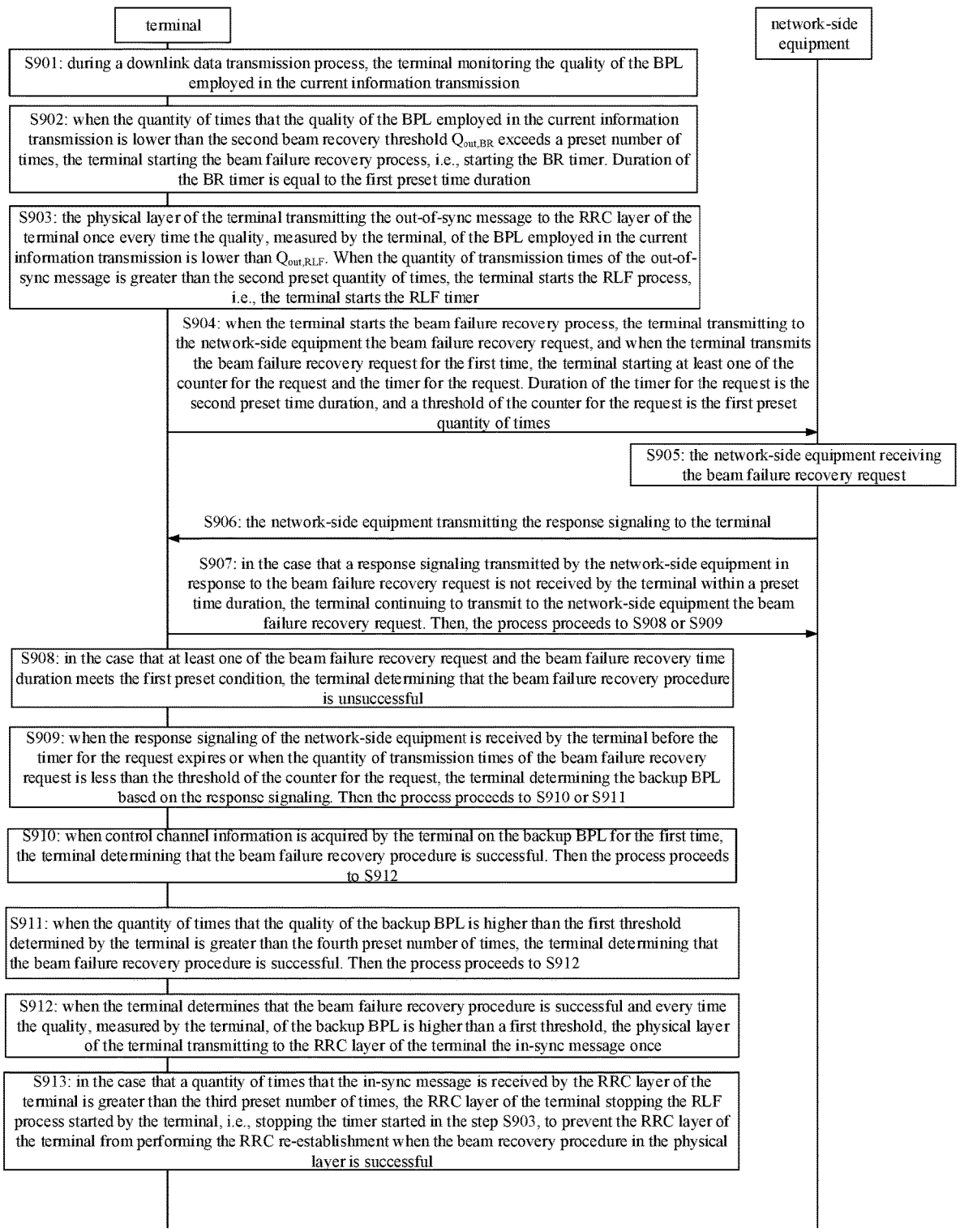
FIG. 9b is a schematic flow diagram of a tenth embodiment of a beam failure recovery method provided by this disclosure.

FIG. 9b is a schematic flow diagram of a tenth embodiment of a beam failure recovery method provided by this disclosure. This embodiment relates to a procedure in which the beam failure recovery procedure in the physical layer of the terminal and the RLF procedure in the RRC layer of the terminal are performed in parallel. That is, the starting of the RLF procedure is in parallel to the starting of the beam failure recovery procedure in the physical layer of the terminal. In this embodiment, the preset beam failure recovery trigger condition includes the first beam recovery threshold $Q_{in,BR}$ and the second beam recovery threshold $Q_{out,BR}$ which is lower than the first beam recovery threshold. The preset RLF trigger condition includes the first RLF threshold $Q_{in,RLF}$ and the second RLF threshold $Q_{out,RLF}$ which is lower than the first RLF threshold $Q_{in,RLF}$. The method includes the following steps.

S901: during a downlink data transmission procedure, the terminal monitoring the quality of the BPL employed in the current information transmission.

S902: when the quantity of times that the quality of the BPL employed in the current information transmission is lower than the second beam recovery threshold $Q_{out,BR}$ exceeds a preset quantity of times, the terminal starting the beam failure recovery procedure, i.e., starts the BR timer. Duration of the BR timer is equal to the first preset time duration.

S903: the physical layer of the terminal transmitting the out-of-sync message to the RRC layer of the terminal once every time the quality, measured by the terminal, of the BPL employed in the current information transmission is lower than $Q_{out,RLF}$. When the quantity of transmission times of the out-of-sync message is greater than the second preset quantity of times, the terminal starts the RLF procedure, i.e., the terminal starts the RLF timer.

It is noted, the steps S902 and S903 are performed in parallel, and the time instant when the RLF timer is started may precede the time instant when the BR timer is started, or fall within the time duration of the beam failure recovery procedure.

S904: when the terminal starts the BR timer, the terminal transmitting to the network-side equipment the beam failure recovery request, and when the terminal transmits the beam failure recovery request for the first time, the terminal starting at least one of the counter for the request and the timer for the request. Duration of the timer for the request is equal to the second preset time duration, and a threshold of the counter for the request is the first preset quantity of times.

S905: the network-side equipment receiving the beam failure recovery request.

Here, there may be two scenarios: first, the network-side equipment fails to receive the beam failure recovery request; second, the network-side equipment receives the beam failure recovery request successfully. For an explanation of the specific procedure, refer to the description of the first embodiment.

S906: the network-side equipment transmitting the response signaling to the terminal.

In connection with the aforementioned two scenarios in step S905, there are two corresponding scenarios in this step: first, the network-side equipment receives the beam failure recovery request successfully and transmits the response signaling to the terminal; second, the network-side equipment fails to receive the beam failure recovery request and doesn't transmit the response signaling to the terminal.

S907: in the case that a response signaling transmitted by the network-side equipment in response to the beam failure recovery request is not received by the terminal within a preset time duration, the terminal continuing to transmit to the network-side equipment the beam failure recovery request. Then, the procedure proceeds to S908 or S909.

S908: in the case that at least one of the beam failure recovery request and the beam failure recovery time duration meets the first preset condition, the terminal determining that the beam failure recovery procedure is unsuccessful.

In specific, the determining that the beam failure recovery procedure is unsuccessful may be at least one of the following conditions: when the transmission durations of multiple transmissions of the beam failure recovery request by the terminal exceed the first preset time duration, i.e., the timer for the request expires, the terminal determines that the beam failure recovery procedure is unsuccessful. When the quantity of transmission times of the beam failure recovery request exceeds the threshold of the counter for the request, i.e., the first preset quantity of times, the terminal determines that the beam failure recovery procedure is unsuccessful. When the BR timer of the terminal expires, the terminal determines that the beam failure recovery procedure is unsuccessful.

In another word, when the terminal hasn't received the response signaling of the network-side equipment before the timer for the request expires or when the quantity of transmission times of the beam failure recovery request is lower than the threshold of the counter for the request or when the BR timer of the terminal expires, the terminal determines that the beam failure recovery procedure is unsuccessful.

When the terminal determines that the beam failure recovery procedure is unsuccessful, the physical layer of the terminal no longer notifies the RRC layer of the terminal, that is, the RLF timer in the RRC layer of the terminal is allowed to continue timing until the RLF timer expires, then the terminal performs a radio link recovery.

S909: when the response signaling of the network-side equipment is received by the terminal before the timer for the request expires or when the quantity of transmission times of the beam failure recovery request is less than the threshold of the counter for the request, the terminal determining the backup BPL based on the response signaling. Then the procedure proceeds to S910 or S911.

S910: when control channel information is acquired by the terminal on the backup BPL for the first time, the terminal determining that the beam failure recovery procedure is successful. Then the procedure proceeds to S912.

S911: when the quantity of times that the quality of the backup BPL is higher than the first threshold determined by the terminal is greater than the fourth preset quantity of times, the terminal determining that the beam failure recovery procedure is successful. Then the procedure proceeds to S912.

S912: when the terminal determines that the beam failure recovery procedure is successful and every time the quality, measured by the terminal, of the backup BPL is higher than a first threshold, the physical layer of the terminal transmitting to the RRC layer of the terminal the in-sync message once.

Regarding an explanation of the first threshold, a reference may be made to the detail description of the aforementioned embodiments.

S913: in the case that a quantity of times that the in-sync message is received by the RRC layer of the terminal is greater than the third preset quantity of times, the RRC layer of the terminal stopping the RLF procedure started by the terminal, i.e., stopping the timer started in the step S903, to prevent the RRC layer of the terminal from performing the RRC re-establishment when the beam recovery procedure in the physical layer is successful.

For an explanation of the specific implementation procedure of the steps S901 to S913, refer to the description of the above embodiments, thus a repeated description thereof is omitted herein.

Figure 10:
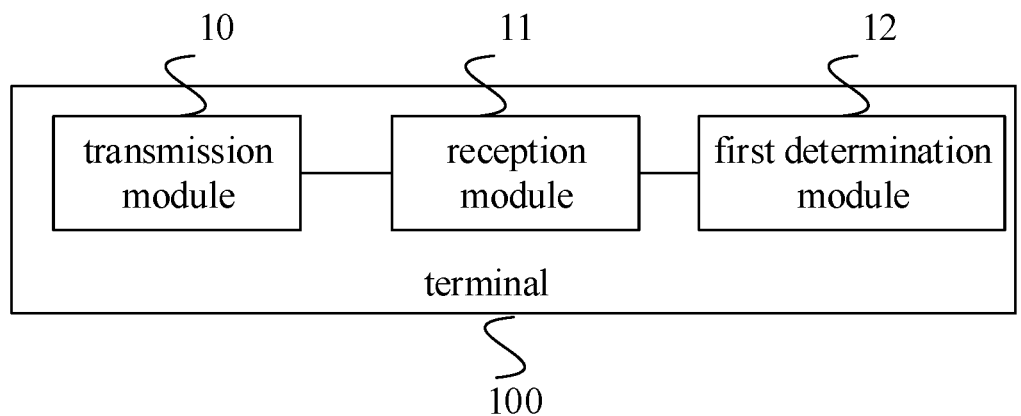
FIG. 10 is a schematic structural diagram of a first embodiment of a terminal provided by this disclosure.

FIG. 10 is a schematic structural diagram of a first embodiment of a terminal provided by this disclosure. The terminal 100 as shown in FIG. 10 includes: a transmission module 10, a reception module 11 and a first determination module 12.

The transmission module 10 is configured to, in the case that a quality of a BPL employed in a current information transmission meets a preset beam failure trigger condition, transmit to a network-side equipment a beam failure recovery request; and the transmission module 10 is configured to, in the case that a response signaling transmitted by the network-side equipment is not received by the reception module 11 within a preset time duration, continue to transmit to the network-side equipment the beam failure recovery request, e.g., periodically or in an event-triggered manner.

The first determination module 12 is configured to, in the case that information related to the beam failure recovery procedure meets a first preset condition, determine that the beam failure recovery procedure is unsuccessful.

The information related to the beam failure recovery procedure includes at least one of the beam failure recovery request and the beam failure recovery time duration. The start time of the beam failure recovery time duration is the time instant when the quality of the BPL employed in the current information transmission meets the beam failure trigger condition.

Optionally, the first preset condition includes at least one of: a quantity of transmission times of the beam failure recovery request reaching a first preset quantity of times; a transmission duration during which the beam failure recovery request is transmitted for at least one time, reaching a first preset time duration; and the beam failure recovery time duration reaching a second preset time duration.

Figure 11:
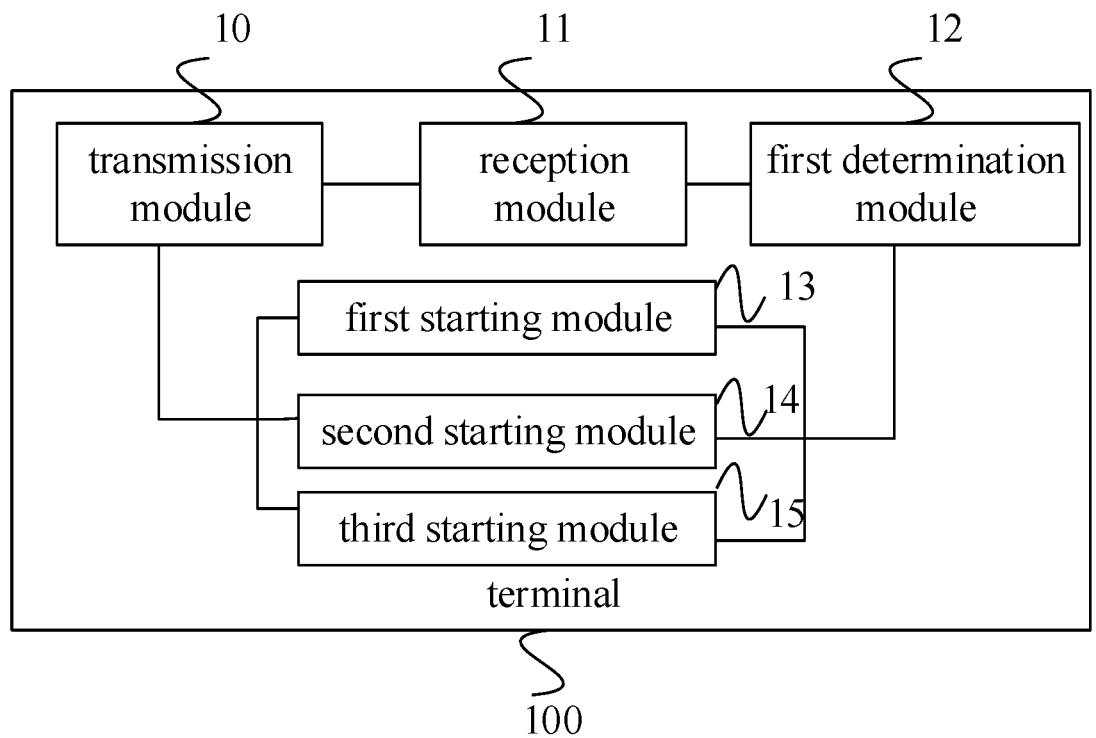
FIG. 11 is a schematic structural diagram of a second embodiment of a terminal provided by this disclosure.

On the basis of FIG. 10, FIG. 11 is a schematic structural diagram of a second embodiment of a terminal provided by this disclosure. Optionally, the terminal 100 may further include at least one of: a first starting module 13, a second starting module 14 and a third starting module 15.

The first starting module 13 is configured to, in the case that the quality of the BPL employed in the current information transmission meets the preset beam failure trigger condition, start the preset BR timer. Duration of the BR timer is equal to the second preset time duration.

The second starting module 14 is configured to, when the transmission module 10 transmits to the network-side equipment the beam failure recovery request for the first time, start the preset counter for the request. A threshold of the counter for the request is the first preset quantity of times.

The third starting module 15 is configured to, when the transmission module 10 transmits to the network-side equipment the beam failure recovery request for the first time, start a preset timer for the request. Duration of the timer for the request is equal to the first preset time duration.

Figure 12:
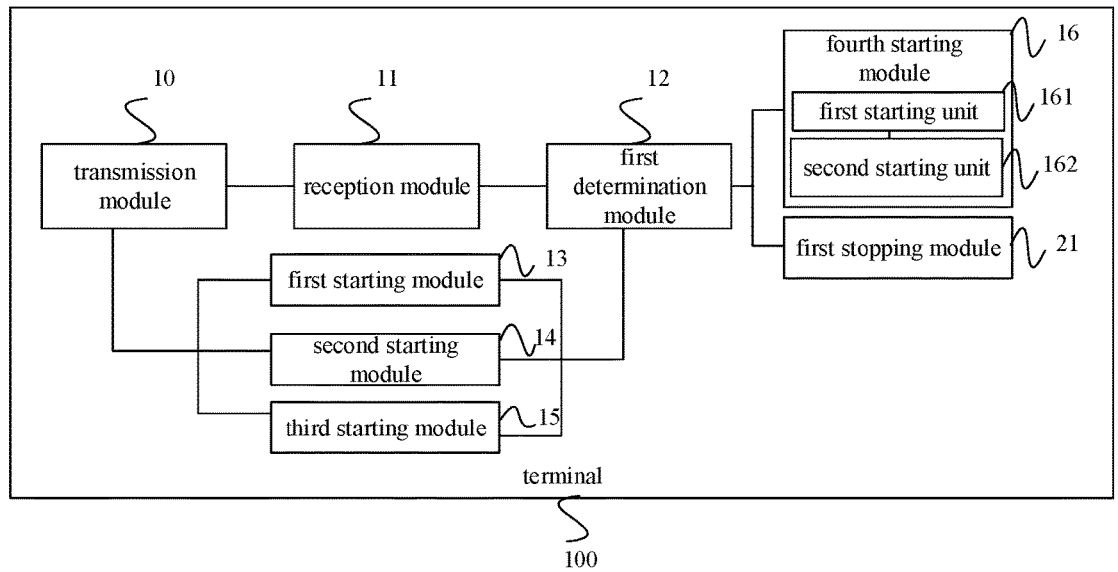
FIG. 12 is a schematic structural diagram of a third embodiment of a terminal provided by this disclosure.

On the basis of FIG. 11, FIG. 12 is a schematic structural diagram of a third embodiment of a terminal provided by this disclosure. Optionally, the terminal 100 may further include: a fourth starting module 16 and a first stopping module 21.

The fourth starting module 16 is configured to, in the case that it is determined that the beam failure recovery procedure is unsuccessful, start a radio link failure and recovery procedure.

The first stopping module 21 is configured to, in the case that it is determined that the beam failure recovery procedure is successful, stop the radio link failure and recovery procedure.

Continuing to refer to FIG. 12, when the beam failure recovery procedure is unsuccessful, optionally, the fourth starting module 16 may include: a first starting unit 161 and a second starting unit 162.

The first starting unit 161 is configured to start the RLF procedure in the RRC layer of the terminal according to the first message transmitted from the physical layer of the terminal to the RRC layer.

The second starting unit 162 is configured to, in the case that a delay time duration started from the starting of the RLF procedure reaches the third preset time duration, start the radio link recovery procedure.

The transmission module 10 is further configured to transmit, by the physical layer of the terminal, to the RRC layer of the terminal the out-of-sync message at least once; and the first starting unit 161 is configured to, in the case that the quantity of transmission times of the out-of-sync message is greater than the second preset quantity of times, start the RLF procedure.

Further, the first starting unit 161 is configured to start the RLF timer. A duration of the RLF timer is equal to the third preset time duration.

Optionally, the transmission module 10 is further configured to transmit, by the physical layer of the terminal, to the RRC layer of the terminal the out-of-sync message at least once in a manner that the transmission module 10 is configured to transmit, by the physical layer of the terminal, to the RRC layer of the terminal the out-of-sync message at least once during the beam failure recovery procedure; or configured to transmit, by the physical layer of the terminal, to the RRC layer of the terminal the out-of-sync message at least once according to a preset out-of-sync transmission scheme after the beam failure recovery procedure is unsuccessful.

Optionally, the transmission module 10 is configured to transmit, by the physical layer of the terminal, to the RRC layer of the terminal the out-of-sync message at least once during the beam failure recovery procedure in a manner that the transmission module 10 is configured to transmit, by the physical layer of the terminal, to the RRC layer of the terminal the out-of-sync message at least once according to the quantity of transmission times of the beam failure recovery request; or configured to transmit, by the physical layer of the terminal, to the RRC layer of the terminal the out-of-sync message at least once according to a measured quality of the BPL employed in the current information transmission after the transmitting the beam failure recovery request.

Optionally, in the case that it is determined by the first determination module 12 that the beam failure recovery procedure is successful, the transmission module 10 is further configured to transmit, by the physical layer of the terminal, to the RRC layer of the terminal the second message; and the first stopping module 21 is configured to stop a started RLF procedure according to the second message, to stop the radio link recovery procedure.

Optionally, the transmission module 10 is further configured to transmit, by the physical layer of the terminal, to the RRC layer of the terminal the second message in a manner that the transmission module 10 is configured to transmit, by the physical layer of the terminal, to the RRC layer of the terminal an in-sync message at least once; and the first stopping module 21 is configured to, in the case that a quantity of transmission times of the in-sync message is greater than a third preset quantity of times, stop the started RLF procedure.

Optionally, the first stopping module 21 is configured to stop the started RLF timer.

The terminal provided by this disclosure may implement the foregoing method embodiments and has a similar implementation principle and technical effect, a detailed description thereof is not repeated herein.

Figure 13:
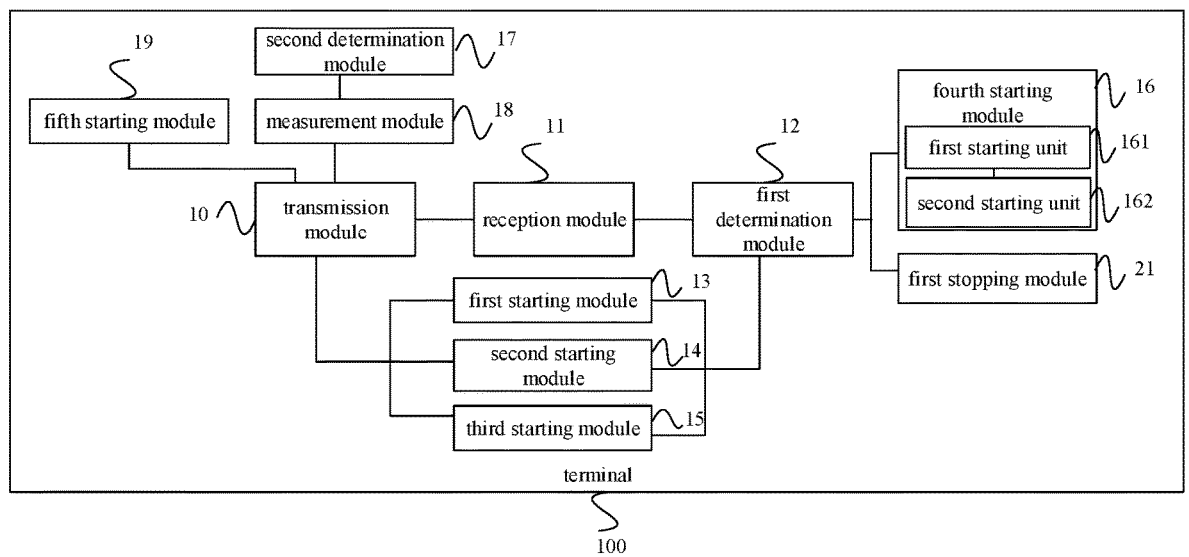
FIG. 13 is a schematic structural diagram of a fourth embodiment of a terminal provided by this disclosure.

Further, on the basis of FIG. 12, FIG. 13 is a schematic structural diagram of a fourth embodiment of a terminal provided by this disclosure. Optionally, as shown in FIG. 13, the terminal 100 may include: a second determination module 17 and a measurement module 18; optionally, the terminal 100 may further include a fifth starting module 19.

The second determination module 17 is configured to, in the case that the response signaling is received by the reception module 11, determine a backup BPL according to the response signaling; the measurement module 18 is configured to measure a quality of the backup BPL at least once; and the transmission module 10 is configured to transmit, by the physical layer of the terminal, to the RRC layer of the terminal the in-sync message once every time the quality of the backup BPL is measured and the measured quality of the backup BPL is higher than the first threshold.

The first threshold is a first beam recovery threshold among thresholds of the preset beam failure trigger condition or a first RLF threshold among thresholds of a preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Optionally, the transmission module 10 is further configured to, prior to transmitting, by the physical layer of the terminal, to the RRC layer of the terminal the in-sync message at least once, in the case that the quality of the BPL employed in the current information transmission meets a preset RLF trigger condition, transmit, by the physical layer of the terminal, to the RRC layer of the terminal an out-of-sync message at least once; and the fifth starting module 19 is configured to, in the case that a quantity of transmission times of the out-of-sync message is greater than a second preset quantity of times, start the RLF procedure.

Optionally, the fifth starting module 19 is configured to start an RLF timer.

Figure 14:
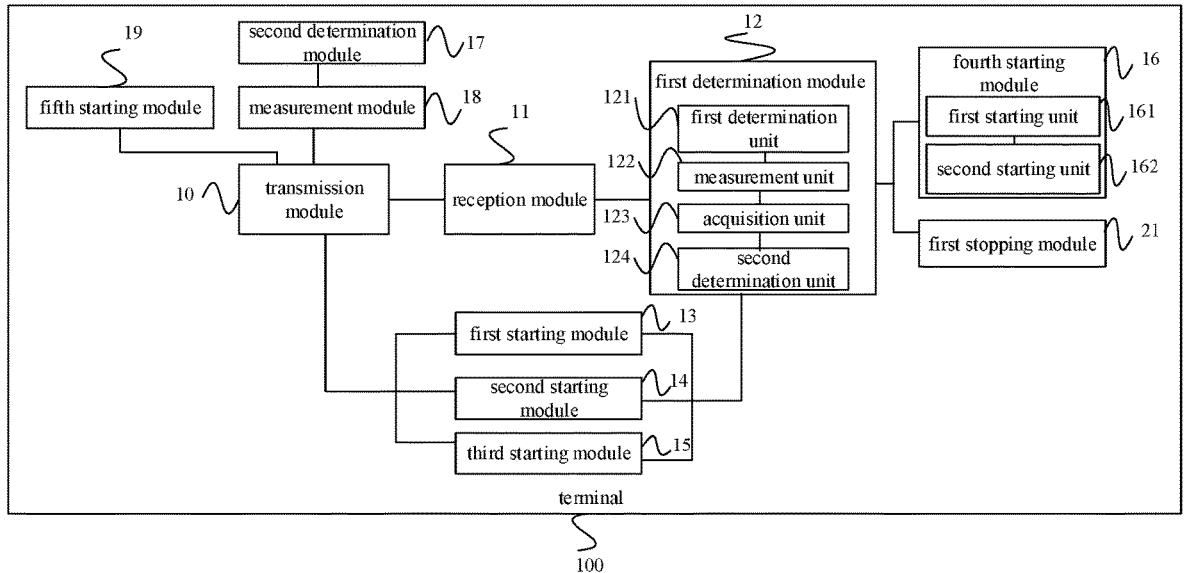
FIG. 14 is a schematic structural diagram of a fifth embodiment of a terminal provided by this disclosure.

Further, on the basis of FIG. 13, FIG. 14 is a schematic structural diagram of a fifth embodiment of a terminal provided by this disclosure. Optionally, as shown in FIG. 14, the first determination module 12 includes: a first determination unit 121, a measurement unit 122, an acquisition unit 123 and a second determination unit 124.

The first determination unit 121 is configured to, in the case that the response signaling is received by the reception module 11, determine a backup BPL based on the response signaling.

The measurement unit 122 is configured to measure a quality of the backup BPL at least once.

The acquisition unit 123 is configured to acquire a quantity of times that the quality of the backup BPL is higher than the first threshold, if the measured quality of the backup BPL is higher than the first threshold when the terminal measures the quality of the backup BPL.

The second determination unit 124 is configured to, in the case that the quantity of times that the quality of the backup BPL is higher than the first threshold is greater than a fourth preset quantity of times, determine that the beam failure recovery procedure is successful.

The first threshold is a first beam recovery threshold among thresholds of the preset beam failure trigger condition or a first RLF threshold among thresholds of a preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Figure 15:
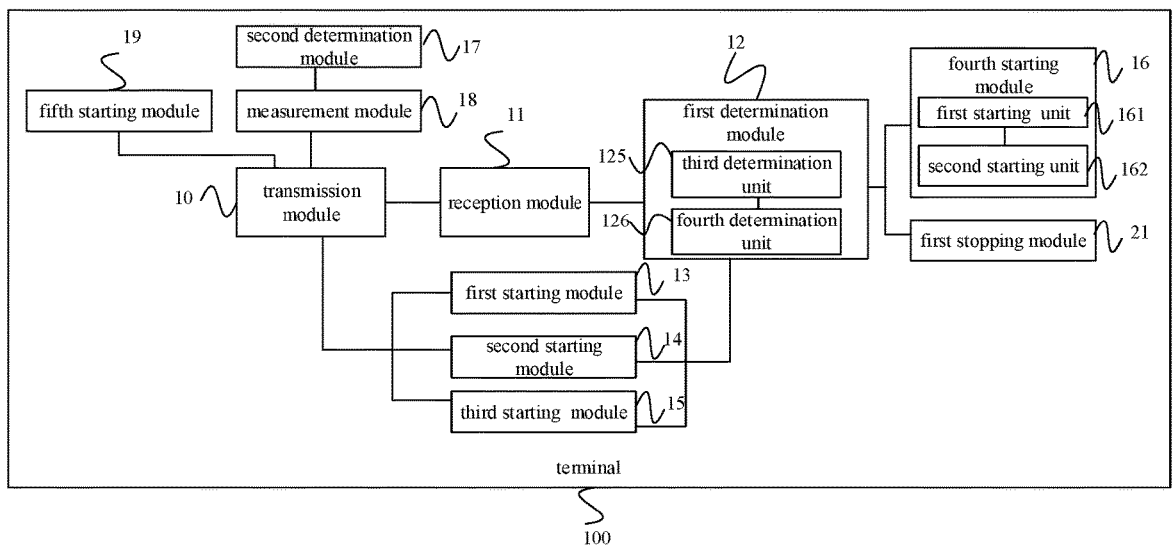
FIG. 15 is a schematic structural diagram of a sixth embodiment of a terminal provided by this disclosure.

Further, on the basis of FIG. 13, FIG. 15 is a schematic structural diagram of a sixth embodiment of a terminal provided by this disclosure. Optionally, as shown in FIG. 15, the first determination module 12 includes: a third determination unit 125 and a fourth determination unit 126.

The third determination unit 125 is configured to, in the case that the response signaling is received by the reception module 11, determine a backup BPL based on the response signaling.

The fourth determination unit 126 is configured to, in the case that control channel information is acquired by the reception module 11 on the backup BPL, determine that the beam failure recovery procedure is successful.

Figure 16:
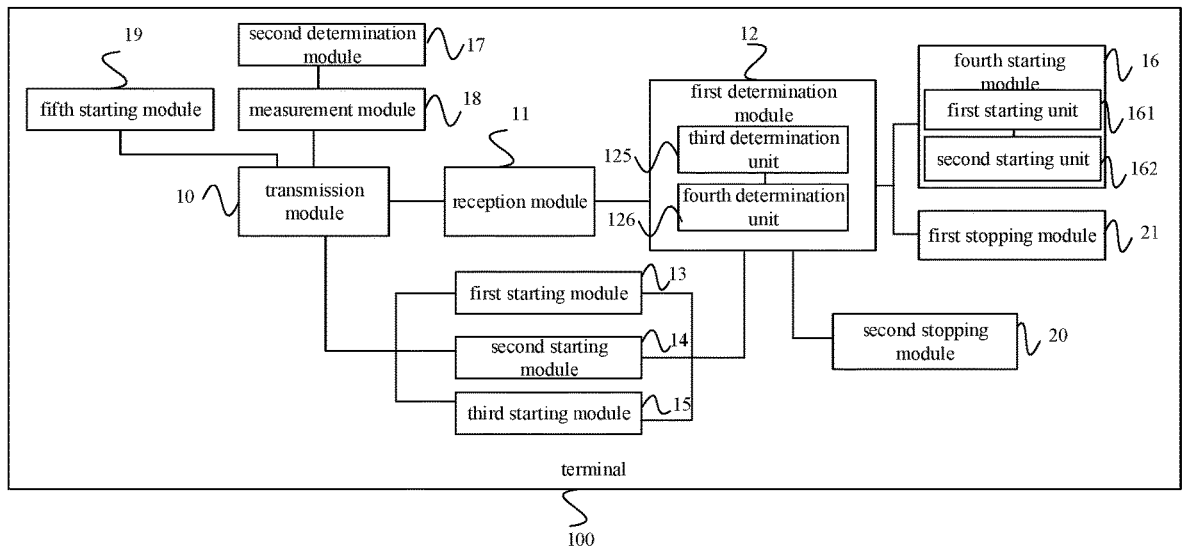
FIG. 16 is a schematic structural diagram of a seventh embodiment of a terminal provided by this disclosure.

Further, on the basis of the embodiments as shown in FIG. 14 or FIG. 15, a seventh embodiment as shown in FIG. 16 further includes a second stopping module 20.

The second stopping module 20 is configured to, in the case that it is determined by the first determination module 12 that the beam failure recovery procedure is successful, stop the BR timer.

It is noted, FIG. 16 is a schematic diagram drawn on the basis of FIG. 15, but certainly, FIG. 16 may also be drawn based on the structure of FIG. 14.

Optionally, the reception module 11 is configured to, after transmitting, by the transmission module 10, to the network-side equipment the beam failure recovery request, receive the response signaling transmitted by the network-side equipment on the BPL employed in the current information transmission and at least one backup BPL.

The terminal may implement various procedures of the method embodiments of FIG. 2 to FIG. 9 which are applied to a terminal, and a detailed description thereof is omitted to avoid repetition.

According to the terminal provided by the embodiments of this disclosure, in the case that the terminal determines that a quality of a BPL employed in a current information transmission meets a preset beam failure trigger condition, the terminal transmits to a network-side equipment a beam failure recovery request; in the case that a response signaling transmitted by the network-side equipment is not received by the terminal within a preset time duration, the terminal continues to transmit to the network-side equipment the beam failure recovery request; and in the case that at least one of the beam failure recovery request and the beam failure recovery time duration meets a first preset condition, the terminal determines that the beam failure recovery procedure is unsuccessful, such that the terminal may be handed over to a new cell or perform a radio link re-establishment or recovery procedure in a timely manner, and in this way the terminal is absolved from waiting for a response of the network-side equipment for a long time, thereby not only reducing data transmission latency and terminal power consumption but also reducing terminal overhead. On the other hand, when the terminal determines that the beam failure recovery procedure in the physical layer is unsuccessful, the terminal starts the radio link failure and recovery procedure in the RRC layer; when the terminal determines that the beam failure recovery procedure in the physical layer is successful, the terminal stops the radio link failure and recovery procedure in the RRC layer, which may not only prevent the situation that despite the fact that a beam recovery procedure is unsuccessful in the physical layer, the RRC re-establishment won't take place in the RRC layer until a radio link failure is detected in the RRC layer, but also prevent the situation that after the beam failure recovery procedure in the physical layer is successful, the radio link re-establishment is performed blindly in the RRC layer of the terminal because there is no way for the RRC layer of the terminal to know beam failure recovery procedure being successful in the physical layer, resulting in the recovered beam being stopped again, thus prolonging the latency in data transmission. As a result, the terminal reduces the data transmission latency greatly.

Figure 17:
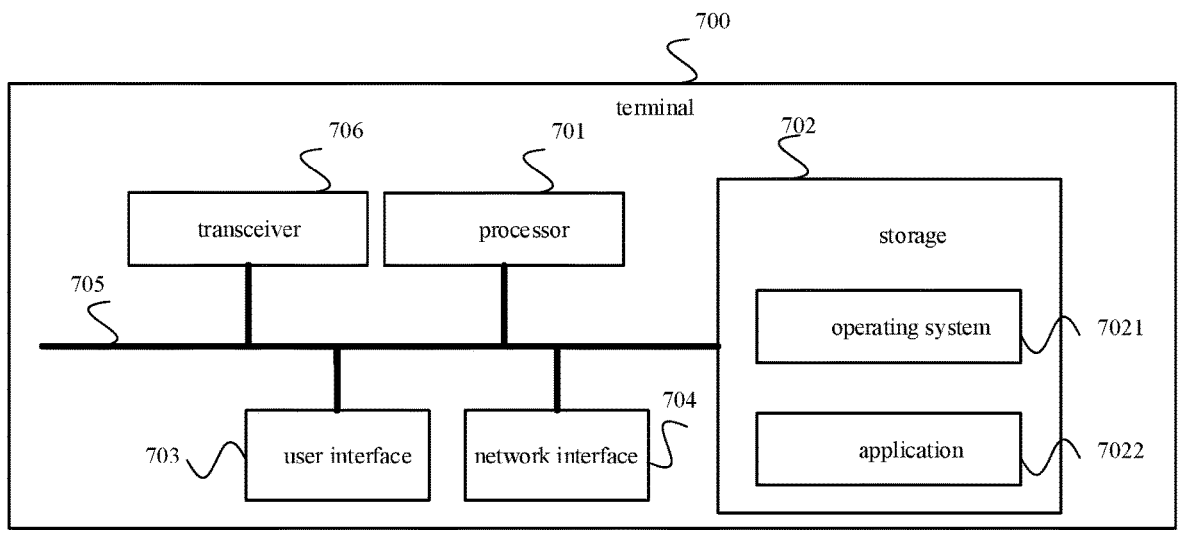
FIG. 17 is a schematic structural diagram of an eighth embodiment of a terminal provided by this disclosure.

FIG. 17 is a schematic structural diagram of an eighth embodiment of a terminal provided by this disclosure. The terminal 700 as shown in FIG. 17 includes: at least one processor 701, a storage 702, at least one network interface 704 and a user interface 703. Various components in the terminal 700 are coupled to each other by a bus system 705. It is understood, the bus system 705 is configured to enable communication connections between these components. In addition to data bus, the bus system 705 includes a power bus, a control bus and a status signal bus. For clarity, various buses are all labeled as the bus system 705 in FIG. 17. Additionally, the embodiment of this disclosure further includes a transceiver 706. The transceiver may include multiple elements, such as a transmitter and a receiver, to allow for communication with various other apparatuses on the transmission medium.

The user interface 703 may include a display, a keyboard or click device (e.g., a mouse), a trackball, a touchpad, a touch screen, etc.

It is understood, the storage 702 in the embodiment of this disclosure may be a volatile or non-volatile storage, or may include both. The non-volatile storage may be a Read-Only Memory (ROM), a Programmable ROM (PROM), an Erasable PROM (EPROM), an Electrically EPROM (EEPROM) or a flash memory. The volatile storage may be a Random Access Memory (RAM), which is used as an external cache. By way of example and without any limitation, many forms of RAM may be used, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM) and Direct Rambus RAM (DRRAM). The storage 702 used in the system and method described in the embodiments of this disclosure is meant to include, without limitation, these and any other suitable types of storages.

In some implementations, the storage 702 stores following elements: executable module or data structure, or a subset or extension set thereof, such as an operating system 7021 and an application 7022.

The operating system 7021 includes various system programs, such as framework layer programs, core library layer programs and driver layer programs, to implement various fundamental services and procedure hardware-based tasks. The application 7022 includes various applications, such as Media Player and Browser, to implement a variety of application services. The program implementing the method according to embodiments of this disclosure may be included in the application 7022.

According to embodiments of this disclosure, by calling programs or instructions stored in the storage 702, which may specifically be programs or instructions stored in the application 7022, the transceiver 706 is configured to, when the processor determines that a quality of a BPL employed in a current information transmission meets a preset beam failure trigger condition, transmit to a network-side equipment a beam failure recovery request, and when a response signaling transmitted by the network-side equipment is not received within a preset time duration, continue to transmit to the network-side equipment the beam failure recovery request; and the processor 701 is configured to, when information related to the beam failure recovery meets a first preset condition, determine that the beam failure recovery procedure is unsuccessful.

The information related to the beam failure recovery includes at least one of the beam failure recovery request and the beam failure recovery time duration, and the start time of the beam failure recovery time duration is the time instant when the quality of the BPL employed in the current information transmission meets the beam failure trigger condition.

The method disclosed in the embodiments of this disclosure may be applied to the processor 701 or implemented by the processor 701. The processor 701 may be an integrated circuit (IC) chip capable of processing signals. During the procedure of implementation, steps of the foregoing method may be implemented in form of hardware by integrated logic circuits in the processor 701, or in form of software by instructions. The processor 701 may be a general purpose processor, Digital Signal Processor (DSP), Application Specific Integrated Circuit (ASIC), Field Programmable Gate Array (FPGA) or other programmable logic device, discrete gate or transistor logic device, discrete hardware component, that is capable of implementing or executing the various methods, steps and logic block diagrams disclosed in the embodiments of this disclosure. The general purpose processor may be a microprocessor, or any conventional processor, etc. The steps of the methods disclosed with reference to the embodiments of this disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the storage 702. The processor 701 reads information from the storage 702 and performs the steps of the methods with its hardware.

It is understood, the embodiments described in this disclosure may be implemented by hardware, software, firmware, middleware, microcode or a combination thereof. For hardware implementation, processing units may be implemented in one or more Application Specific Integrated Circuits (ASIC), Digital Signal Processor (DSP), DSP Device (DSPD), Programmable Logic Device (PLD), Field-Programmable Gate Array (FPGA), general purpose processor, controller, microcontroller, microprocessor, other electronic unit configured to perform the function described in this application or a combination thereof.

For software implementation, the technical solution described in the embodiments of this disclosure may be implemented by a module (e.g., procedure, function, etc.) configured to perform the function described in the embodiments of this disclosure. Software code may be stored in a storage and executed by the processor 701. The storage may be implemented internal or external to the processor 701.

Optionally, the first preset condition includes at least one of: a quantity of transmission times of the beam failure recovery request reaching a first preset quantity of times; a transmission duration during which the beam failure recovery request is transmitted for at least one time, reaching a first preset time duration; and the beam failure recovery time duration reaching a second preset time duration.

Optionally, the processor 701 is further configured to, in the case that the quality of the BPL employed in the current information transmission meets the preset beam failure trigger condition, start the preset BR timer. Duration of the BR timer is equal to the second preset time duration.

Optionally, the processor 701 is further configured to, when the transceiver 706 is transmitting to the network-side equipment the beam failure recovery request for the first time, start a preset counter for the request. A threshold of the counter for the request is the first preset quantity of times.

Optionally, the processor 701 is further configured to, when the transceiver 706 is transmitting to the network-side equipment the beam failure recovery request for the first time, start a preset timer for the request. Duration of the timer for the request is equal to the first preset time duration.

Optionally, as another embodiment, the processor 701 is further configured to, in the case that it is determined that the beam failure recovery procedure is unsuccessful, start a radio link failure and recovery procedure; and in the case that it is determined that the beam failure recovery procedure is successful, stop the radio link failure and recovery procedure.

Optionally, in the case that the beam failure recovery procedure is unsuccessful, as another embodiment, the processor 701 is further configured to start the RLF procedure in the RRC layer of the terminal according to a first message transmitted from the physical layer of the terminal to the RRC layer; and in the case that a delay time duration started from the starting of the RLF procedure reaches a third preset time duration, start a radio link recovery procedure.

Optionally, the transceiver 706 is further configured to transmit, by the physical layer of the terminal, to the RRC layer of the terminal an out-of-sync message at least once; and the processor 701 is further configured to, in the case that a quantity of transmission times of the out-of-sync message is greater than a second preset quantity of times, start the RLF procedure.

Optionally, the processor 701 is configured to start the RLF procedure in a manner that the processor 701 is configured to start a RLF timer and the duration of the RLF timer is equal to the third preset time duration.

Optionally, the transceiver 706 is specifically configured to transmit, by the physical layer of the terminal, to the RRC layer of the terminal the out-of-sync message at least once during the beam failure recovery; or transmit, by the physical layer of the terminal, to the RRC layer of the terminal the out-of-sync message at least once according to a preset out-of-sync transmission scheme after the beam failure recovery procedure is unsuccessful.

Optionally, the transceiver 706 is specifically configured to transmit, by the physical layer of the terminal, to the RRC layer of the terminal the out-of-sync message at least once according to the quantity of times the beam failure recovery request is transmitted; or transmit, by the physical layer of the terminal, to the RRC layer of the terminal the out-of-sync message at least once according to a measured quality of the BPL employed in the current information transmission after the transmitting the beam failure recovery request.

Optionally, in the case that the beam failure recovery procedure is unsuccessful, as another embodiment, the transceiver 706 is further configured to transmit, by a physical layer of the terminal, to the RRC layer of the terminal a second message; and the processor 701 is further configured to stop a started RLF procedure according to the second message, to stop a radio link recovery procedure.

Optionally, the transceiver 706 is specifically configured to transmit, by the physical layer of the terminal, to the RRC layer of the terminal an in-sync message at least once; and the processor 701 is specifically configured to, in the case that a quantity of transmission times of the in-sync message is greater than a third preset quantity of times, stop the started RLF procedure.

Optionally, the processor 701 is configured to stop the started RLF procedure in a manner that the processor 701 is configured to stop a started RLF timer.

Optionally, the transceiver 706 is specifically configured to, in the case that the response signaling is received, determine a backup BPL according to the response signaling; measure a quality of the backup BPL at least once; and transmit, by the physical layer of the terminal, to the RRC layer of the terminal the in-sync message once every time the quality of the backup BPL is measured and the measured quality of the backup BPL is higher than a first threshold.

The first threshold is a first beam recovery threshold among thresholds of the preset beam failure trigger condition or a first RLF threshold among thresholds of a preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Optionally, the transceiver 706 is further configured to transmit, by the physical layer of the terminal, to the RRC layer of the terminal the out-of-sync message at least once when the processor 701 determines that a quality of the BPL employed in the current information transmission meets a preset RLF trigger condition; and the processor 701 is further configured to, in the case that the quantity of transmission times of the out-of-sync message is greater than the second preset quantity of times, start the RLF procedure.

Optionally, the processor 701 is configured to start the RLF procedure in a manner that the processor 701 is configured to start a RLF timer.

Optionally, the processor 701 is further configured to acquire a quantity of times the quality of the backup BPL is higher than a first threshold when the quality of the backup BPL measured by the transceiver 706 is higher than the first threshold; and in the case that the quantity of times the quality of the backup BPL is higher than the first threshold is greater than a fourth preset quantity of times, determine that the beam failure recovery procedure is successful.

The first threshold is a first beam recovery threshold among thresholds of the preset beam failure trigger condition or a first RLF threshold among thresholds of a preset RLF trigger condition. The thresholds of the preset beam failure trigger condition includes the first beam recovery threshold and the second beam recovery threshold, and the first beam recovery threshold is greater than the second beam recovery threshold. The thresholds of the preset RLF trigger condition includes the first RLF threshold and the second RLF threshold, and the first RLF threshold is greater than the second RLF threshold.

Optionally, the processor 701 is further configured to, in the case that control channel information is acquired by the transceiver 706 on the backup BPL, determine that the beam failure recovery procedure is successful.

Optionally, the processor 701 is further configured to, in the case that it is determined that the beam failure recovery procedure is successful, stop the BR timer.

Optionally, the transceiver 706 is further configured to receive the response signaling transmitted by the network-side equipment on the BPL employed in the current information transmission and at least one backup BPL.

The terminal may implement various procedures achieved by mobile terminals of foregoing embodiments, and a detailed description thereof is omitted to avoid repetition.

According to the terminal provided by the embodiments of this disclosure, in the case that the terminal determines that a quality of a BPL employed in a current information transmission meets a preset beam failure trigger condition, the terminal transmits to a network-side equipment a beam failure recovery request; in the case that a response signaling transmitted by the network-side equipment is not received by the terminal within a preset time duration, the terminal continues to transmit to the network-side equipment the beam failure recovery request; and in the case that at least one of the beam failure recovery request and the beam failure recovery time duration meets a first preset condition, the terminal determines that the beam failure recovery procedure is unsuccessful, such that the terminal may be handed over to a new cell or perform a radio link re-establishment or recovery procedure in a timely manner, and in this way the terminal is absolved from waiting for a response of the network-side equipment for a long time, thereby not only reducing data transmission latency and terminal power consumption but also reducing terminal overhead. On the other hand, when the terminal determines that the beam failure recovery procedure in the physical layer is unsuccessful, the terminal starts the radio link failure and recovery procedure in the RRC layer; when the terminal determines that the beam failure recovery procedure in the physical layer is successful, the terminal stops the radio link failure and recovery procedure in the RRC layer, which may not only prevent the situation that despite the fact that a beam recovery procedure is unsuccessful in the physical layer, the RRC re-establishment won't take place in the RRC layer until a radio link failure is detected in the RRC layer, but also prevent the situation that after the beam failure recovery procedure in the physical layer is successful, the radio link re-establishment is performed blindly in the RRC layer of the terminal because there is no way for the RRC layer of the terminal to know beam failure recovery procedure being successful in the physical layer, resulting in the recovered beam being stopped again, thus prolonging the latency in data transmission. As a result, the terminal reduces the data transmission latency greatly.

A person skilled in the art may be aware that, in combination with the examples described in the embodiments of this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for convenient and brief description, for a detailed working procedure of the foregoing system, apparatus, and unit, reference may be made to a corresponding procedure in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a Universal Serial Bus (USB) flash drive, a removable hard disk, a ROM, a RAM, a magnetic disk, or an optical disc.

The aforementioned are merely specific implementations of this disclosure, but the scope of the disclosure is by no means limited thereto. Any modifications or replacements that would easily occurred to those skilled in the art, without departing from the technical scope disclosed in the disclosure, should be encompassed in the scope of this disclosure. Therefore, the scope of this disclosure is to be determined by the scope of the claims.

Finally, it should be noted, the foregoing embodiments are only used to illustrate the technical solution of this disclosure, and by no means constitute any limitation of this disclosure; although detailed description of this disclosure is provided with reference to the foregoing embodiments, it should be appreciated that modifications to the technical solution set forth in the embodiments or equivalent replacements of a part or all of the technical features may be made by one of ordinary skill in the art, and these modifications or replacements will not make essences of corresponding technical solutions to depart from the scope of the technical solutions of the embodiments of this disclosure.

What is claimed is:

1. A beam failure recovery method, applied to a terminal, comprising:
   in the case that a quality of a Beam Pair Link (BPL) employed in a current information transmission meets a preset beam failure trigger condition, transmitting to a network-side equipment a beam failure recovery request;
   in the case that a response signaling transmitted by the network-side equipment is not received within a preset time duration, continuing to transmit to the network-side equipment the beam failure recovery request; and
   in the case that information related to a beam failure recovery procedure meets a first preset condition, determining that the beam failure recovery procedure is unsuccessful,
   wherein the information related to the beam failure recovery procedure comprises at least one of a transmission duration during which the beam failure recovery request is transmitted for at least one time or a beam failure recovery time duration;
   the first preset condition comprises at least one of: a transmission duration during which the beam failure recovery request is transmitted for at least one time, reaching a first preset time duration, or the beam failure recovery time duration reaching a second preset time duration;

the method further comprises:

in the case that the quality of the BPL employed in the current information transmission meets the preset beam failure trigger condition, starting a preset Beam Recovery (BR) timer, wherein duration of the BR timer is equal to the second preset time duration;

the method further comprises:

in the case that it is determined that the beam failure recovery procedure is unsuccessful, starting a radio link failure and recovery procedure; and in the case that it is determined that the beam failure recovery procedure is successful, stopping the radio link failure and recovery procedure;

wherein the stopping the radio link failure and recovery procedure, comprises:

transmitting, by a physical layer of the terminal, to a Radio Resource Control (RRC) layer of the terminal a second message; and stopping, by the RRC layer of the terminal, a started Radio Link Failure (RLF) procedure according to the second message, to stop a radio link recovery procedure;

wherein the transmitting, by the physical layer of the terminal, to the RRC layer of the terminal the second message, comprises:

transmitting, by the physical layer of the terminal, to the RRC layer of the terminal an in-sync message at least once; and the stopping, by the RRC layer of the terminal, the started RLF procedure according to the second message, comprises:

in the case that the quantity of transmission times of the in-sync message is greater than a third preset quantity of times, stopping the started RLF procedure;

wherein the transmitting, by the physical layer of the terminal, to the RRC layer of the terminal the in-sync message at least once, comprises:

in the case that the response signaling is received, determining a backup BPL according to the response signaling;

measuring the quality of the backup BPL at least once; and transmitting, by the physical layer of the terminal, to the RRC layer of the terminal the in-sync message if the measured quality of the backup BPL is higher than a first threshold when the terminal measures the quality of the backup BPL, wherein the first threshold is a first beam recovery threshold among thresholds of the preset beam failure trigger condition or a first RLF threshold among thresholds of the preset RLF trigger condition; the thresholds of the preset beam failure trigger condition comprises the first beam recovery threshold and a second beam recovery threshold, and the first beam recovery threshold is greater than the second beam recovery threshold; the thresholds of the preset RLF trigger condition comprises the first RLF threshold and a second RLF threshold, and the first RLF threshold is greater than the second RLF threshold.

2. The method according to claim 1, further comprising:
starting a preset counter for the request when transmitting to the network-side equipment the beam failure recovery request for the first time, wherein a threshold of the counter for the request is the first preset quantity of times; or, starting a preset timer for the request when transmitting to the network-side equipment the beam failure recovery request for the first time, wherein duration of the timer for the request is equal to the first preset time duration.

3. The method according to claim 1, wherein the starting the radio link failure and recovery procedure comprises:
starting a Radio Link Failure (RLF) procedure in Radio Resource Control (RRC) layer of the terminal according to a first message transmitted from physical layer of the terminal to the RRC layer; and in the case that a delay time duration started from the starting of the RLF procedure reaches a third preset time duration, starting a radio link recovery procedure.

4. The method according to claim 3, wherein the starting the RLF procedure in the RRC layer of the terminal according to the first message transmitted from the physical layer of the terminal to the RRC layer, comprises:

transmitting, by the physical layer of the terminal, to the RRC layer of the terminal an out-of-sync message at least once; and in the case that a quantity of transmission times of the out-of-sync message is greater than a second preset quantity of times, starting the RLF procedure.

5. The method according to claim 4, wherein the starting the RLF procedure comprises:
starting an RLF timer, wherein duration of the RLF timer is equal to the third preset time duration.

6. The method according to claim 4, wherein the transmitting, by the physical layer of the terminal, to the RRC layer of the terminal the out-of-sync message at least once, comprises:

transmitting, by the physical layer of the terminal, to the RRC layer of the terminal the out-of-sync message at least once during the beam failure recovery procedure; or transmitting, by the physical layer of the terminal, to the RRC layer of the terminal the out-of-sync message at least once according to a preset out-of-sync transmission scheme after the beam failure recovery procedure is unsuccessful.

7. The method according to claim 6, wherein the transmitting, by the physical layer of the terminal, to the RRC layer of the terminal the out-of-sync message at least once during the beam failure recovery procedure, comprises:

transmitting, by the physical layer of the terminal, to the RRC layer of the terminal the out-of-sync message at least once according to the quantity of transmission times of the beam failure recovery request; or transmitting, by the physical layer of the terminal, to the RRC layer of the terminal the out-of-sync message at least once according to a measured quality of the BPL employed in the current information transmission after transmission of the beam failure recovery request.

8. The method according to claim 1, wherein, prior to the transmitting, by the physical layer of the terminal, to the RRC layer of the terminal the in-sync message at least once, the method further comprises:

in the case that the quality of the BPL employed in the current information transmission meets a preset RLF trigger condition, transmitting, by the physical layer of the terminal, to the RRC layer of the terminal an out-of-sync message at least once; and in the case that the quantity of transmission times of the out-of-sync message is greater than a second preset quantity of times, starting the RLF procedure.

9. The method according to claim 8, wherein the starting the RLF procedure, comprises: starting an RLF timer;

the stopping the started RLF procedure, comprises: stopping a started RLF timer.

10. The method according to claim 1, wherein, after the transmitting to the network-side equipment the beam failure recovery request, the method further comprises: receiving the response signaling transmitted by the network-side equipment on the BPL employed in the current information transmission and at least one backup BPL.

11. A beam failure recovery method, applied to a terminal, comprising:
in the case that a quality of a Beam Pair Link (BPL) employed in a current information transmission meets a preset beam failure trigger condition, transmitting to a network-side equipment a beam failure recovery request;
in the case that a response signaling transmitted by the network-side equipment is not received within a preset time duration, continuing to transmit to the network-side equipment the beam failure recovery request; and
in the case that information related to a beam failure recovery procedure meets a first preset condition, determining that the beam failure recovery procedure is unsuccessful,
wherein the information related to the beam failure recovery procedure comprises at least one of a transmission duration during which the beam failure recovery request is transmitted for at least one time or a beam failure recovery time duration;
the first preset condition comprises at least one of: a transmission duration during which the beam failure recovery request is transmitted for at least one time, reaching a first preset time duration, or the beam failure recovery time duration reaching a second preset time duration;
the method further comprises:
in the case that the quality of the BPL employed in the current information transmission meets the preset beam failure trigger condition, starting a preset Beam Recovery (BR) timer, wherein duration of the BR timer is equal to the second preset time duration;
the method further comprises:
in the case that it is determined that the beam failure recovery procedure is unsuccessful, starting a radio link failure and recovery procedure; and
in the case that it is determined that the beam failure recovery procedure is successful, stopping the radio link failure and recovery procedure;
wherein determining that the beam failure recovery procedure is successful, comprises:
in the case that the response signaling is received by the terminal, determining a backup BPL based on the response signaling;
measuring the quality of the backup BPL at least once;
acquiring the quantity of times that the quality of the backup BPL is higher than a first threshold, if the measured quality of the backup BPL is higher than the first threshold when the terminal measures the quality of the backup BPL; and
in the case that the quantity of times that the quality of the backup BPL is higher than the first threshold, is greater than a fourth preset quantity of times, determining that the beam failure recovery procedure is successful,
wherein the first threshold is a first beam recovery threshold among thresholds of the preset beam failure trigger condition or a first RLF threshold among thresholds of the preset RLF trigger condition; the thresholds of the preset beam failure trigger condition comprises the first beam recovery threshold and a second beam recovery threshold, and the first beam recovery threshold is greater than the second beam recovery threshold; the thresholds of the preset RLF trigger condition comprises the first RLF threshold and a second RLF threshold, and the first RLF threshold is greater than the second RLF threshold.

12. The method according to claim 11, further comprising: in the case that it is determined that the beam failure recovery procedure is successful, stopping the BR timer.

13. A terminal, comprising a processor, a storage storing a program thereon, wherein the processor is configured to call the program stored on the storage, to implement steps of:
in the case that a quality of a Beam Pair Link (BPL) employed in a current information transmission meets a preset beam failure trigger condition, transmitting to a network-side equipment a beam failure recovery request;
in the case that a response signaling transmitted by the network-side equipment is not received within a preset time duration, continuing to transmit to the network-side equipment the beam failure recovery request; and
in the case that information related to a beam failure recovery procedure meets a first preset condition, determining that the beam failure recovery procedure is unsuccessful,
wherein the information related to the beam failure recovery procedure comprises at least one of a transmission duration during which the beam failure recovery request is transmitted for at least one time or a beam failure recovery time duration;
the first preset condition comprises at least one of: a transmission duration during which the beam failure recovery request is transmitted for at least one time, reaching a first preset time duration, or the beam failure recovery time duration reaching a second preset time duration;
wherein the processor is configured to call the program stored on the storage, to implement steps of:
in the case that the quality of the BPL employed in the current information transmission meets the preset beam failure trigger condition, starting a preset Beam Recovery (BR) timer, wherein duration of the BR timer is equal to the second preset time duration;
wherein the processor is configured to call the program stored on the storage, to implement steps of:
in the case that it is determined that the beam failure recovery procedure is unsuccessful, starting a radio link failure and recovery procedure; and
in the case that it is determined that the beam failure recovery procedure is successful, stopping the radio link failure and recovery procedure;
wherein when determining that the beam failure recovery procedure is successful, the processor is configured to call the program stored on the storage, to implement steps of:
in the case that the response signaling is received by the terminal, determining a backup BPL based on the response signaling;
measuring the quality of the backup BPL at least once;
acquiring the quantity of times that the quality of the backup BPL is higher than a first threshold, if the measured quality of the backup BPL is higher than the first threshold when the terminal measures the quality of the backup BPL; and in the case that the quantity of times that the quality of the backup BPL is higher than the first threshold, is greater than a fourth preset quantity of times, determining that the beam failure recovery procedure is successful, wherein the first threshold is a first beam recovery threshold among thresholds of the preset beam failure trigger condition or a first RLF threshold among thresholds of the preset RLF trigger condition; the thresholds of the preset beam failure trigger condition comprises the first beam recovery threshold and a second beam recovery threshold, and the first beam recovery threshold is greater than the second beam recovery threshold; the thresholds of the preset RLF trigger condition comprises the first RLF threshold and a second RLF threshold, and the first RLF threshold is greater than the second RLF threshold.

* * * * *